United States Patent
Eguchi et al.

(10) Patent No.: US 11,697,565 B2
(45) Date of Patent: Jul. 11, 2023

(54) MEDIUM FEEDING DEVICE AND IMAGE READING APPARATUS

(71) Applicant: SEIKO EPSON CORPORATION, Tokyo (JP)

(72) Inventors: Seiji Eguchi, Kitakyushu (JP); Takayuki Shiota, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/884,309

(22) Filed: May 27, 2020

(65) Prior Publication Data
US 2020/0377319 A1 Dec. 3, 2020

(30) Foreign Application Priority Data
May 29, 2019 (JP) .................................. 2019-100377

(51) Int. Cl.
- *B65H 7/06* (2006.01)
- *B65H 7/16* (2006.01)
- *B65H 29/24* (2006.01)

(52) U.S. Cl.
CPC .............. *B65H 7/16* (2013.01); *B65H 7/06* (2013.01); *B65H 29/245* (2013.01)

(58) Field of Classification Search
CPC .......... B65H 7/06; B65H 7/16; B65H 29/145; H04N 1/00
See application file for complete search history.

(56) References Cited

U.S. PATENT DOCUMENTS

| | | | |
|---|---|---|---|
| 8,201,823 B2 * | 6/2012 | Morikawa | B65H 7/125 271/258.01 |
| 10,404,878 B2 * | 9/2019 | Shiota | B65H 7/06 |
| 2010/0096799 A1 * | 4/2010 | Shiraiwa | B65H 3/06 271/111 |
| 2017/0267476 A1 | 9/2017 | Miyagi | |
| 2017/0355539 A1 * | 12/2017 | Yoshiwara | G03G 15/607 |
| 2017/0359475 A1 * | 12/2017 | Xie | H04N 1/0032 |

(Continued)

FOREIGN PATENT DOCUMENTS

| | | | |
|---|---|---|---|
| JP | 2004-182449 | * | 7/2004 |
| JP | 2004-238158 | | 8/2004 |

(Continued)

OTHER PUBLICATIONS

Machine translation of JP2004-182449. (Year: 2004).*

*Primary Examiner* — Thomas A Morrison
(74) *Attorney, Agent, or Firm* — Workman Nydegger

(57) ABSTRACT

A medium feeding device includes: a medium mounting section that a medium is mounted; a feeding unit that feeds the medium in a feeding direction; a separation unit that separates the medium with the feeding unit; an operation detection unit that is disposed at a position facing a surface of the medium in the medium mounting section and detects a movement of the medium in the feeding direction; an interval forming unit that forms an interval in the feeding direction between a trailing end of a first medium which is the lowest medium fed among media mounted on the medium mounting section and a trailing end of a second medium which is bound with the first medium and stacked on the first medium; and a control unit that stops feeding of the medium based on a detection interval by a detection value of the operation detection unit.

8 Claims, 25 Drawing Sheets

(56) References Cited

U.S. PATENT DOCUMENTS

| | | | | |
|---|---|---|---|---|
| 2018/0179006 A1* | 6/2018 | Kogi | ................. | H04N 1/00477 |
| 2018/0376020 A1* | 12/2018 | Shiota | .................... | G03G 15/55 |
| 2019/0100395 A1* | 4/2019 | Wu | ......................... | B65H 3/06 |
| 2019/0100396 A1* | 4/2019 | Shiota | ................. | B65H 3/5284 |

FOREIGN PATENT DOCUMENTS

| | | |
|---|---|---|
| JP | 2017-165573 | 9/2017 |
| JP | 2019-026393 | 2/2019 |
| JP | 2019-064790 | 4/2019 |

\* cited by examiner

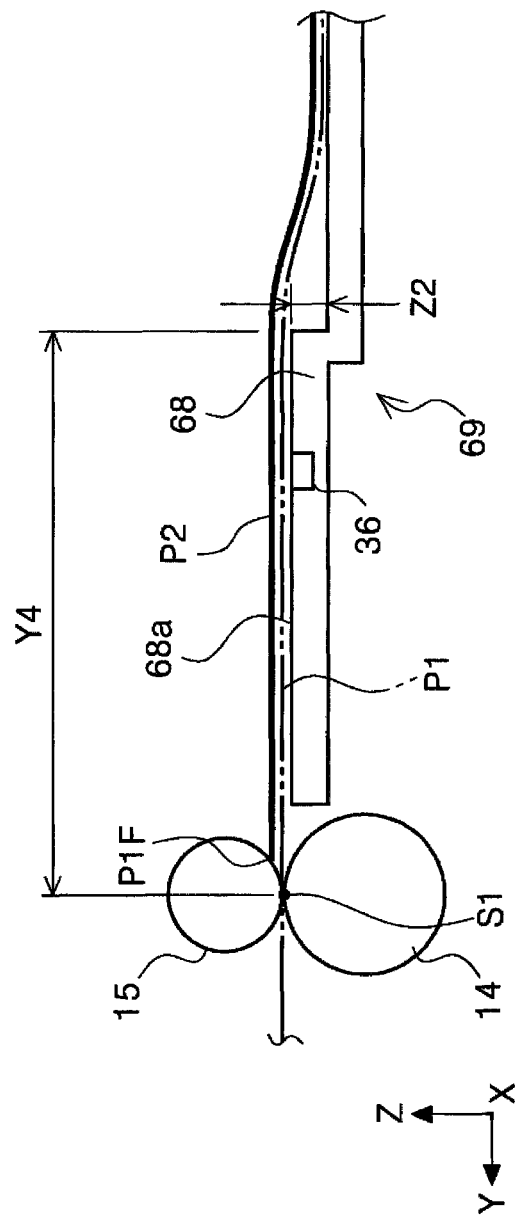

MEDIUM FEEDING DEVICE AND IMAGE READING APPARATUS

The present application is based on, and claims priority from JP Application Serial Number 2019-100377, filed May 29, 2019, the disclosure of which is hereby incorporated by reference herein in its entirety.

BACKGROUND

1. Technical Field

The present disclosure relates to a medium feeding device that feeds a medium and an image reading apparatus including the same.

2. Related Art

In an image reading apparatus or a recording apparatus, a medium feeding device that feeds a medium is provided. When a medium is fed, a feeding abnormality such as a skew of the medium may occur, and in the related art, a technique for detecting such a feeding abnormality is known. JP-A-2019-026393 discloses a sheet feeding device including a mounting section on which a sheet is mounted, a feeding section that feeds the sheet on a mounting section side, a separation section that separates the sheets one by one with the feeding section, and a movement detection section that detects a movement of the sheet on the mounting section.

In the configuration described in JP-A-2019-026393, a tracking-type optical sensor is adopted as the movement detection section in which a document is irradiated with light from a light source, an image obtained by receiving reflected light from the document by an imaging section is acquired at a predetermined sampling cycle, a movement of a tracking target area included in the image is tracked, and a moving amount or a moving direction of the document is detected based on a result thereof.

A change in the document image obtained by imaging a lowest document that moves after a start of separation feeding is tracked, the change in the document image is detected as a movement of the document during the separation, and a separation abnormality pattern is determined.

As a result, when the moving direction of the image area is different from a reference direction, it is determined that the document is skewed, or when the movement of the image area is accompanied by a rotation component, when there is neither a skew abnormality nor a non-feeding abnormality, or the like, it is determined that a staple abnormality occurs when documents bound with a staple or the like are separated.

Although JP-A-2019-026393 mentions the staple abnormality as described above, there is no description or suggestion of a more specific phenomenon of the staple abnormality, a problem in detecting the phenomenon, and means for solving the problem. Hereinafter, the problem in detecting the bound document is specifically described.

In a state where the lowest first document and a second document stacked thereon are bound upstream in a feeding direction, when a first document is fed by the feeding section, in a state where a leading end of the second document is stopped by the separation section, only a trailing end advances downstream, so that the second document bulges upward. When the feeding of the first document further advances, a trailing end area of the second document is reversed, and in a state where an interval is formed between the trailing end of the second document and the trailing end of the first document, a phenomenon occurs that the first document advances downstream in the feeding direction. Since the interval can be detected by the movement detection section described in JP-A-2019-026393, when the interval is detected, the feeding can be stopped assuming that the feeding is abnormal, that is, the bound document is fed.

Here, the interval is formed by separating the trailing end of the first document and the trailing end of the second document. However, the trailing end of the first document and the trailing end of the second document advance downstream in the feeding direction without forming the interval, or the interval is slightly formed even if the interval is formed, and thereby the interval may not be detected by the movement detection section. Alternatively, there may be a case where the trailing end of the second document rises and is not detected by the movement detection section.

SUMMARY

According to an aspect of the present disclosure, there is provided a medium feeding device including: a medium mounting section that forms a medium mounting surface on which a medium is mounted; a feeding unit that feeds a lowest medium among media mounted on the medium mounting section in a feeding direction by coming into contact with the lowest medium; a separation unit that separates the medium with the feeding unit; an operation detection unit that is disposed at a position facing a surface of the medium in the medium mounting section and detects at least a movement of the medium in the feeding direction; a control unit that stops feeding of the medium based on a detection value received from the operation detection unit; and an interval forming unit that is provided upstream of the operation detection unit in the feeding direction and forms a detection interval in the feeding direction by the operation detection unit between a trailing end of a first medium which is the lowest medium fed by the feeding unit among media mounted on the medium mounting section and a trailing end of a second medium which is bound with the first medium and stacked on the first medium.

BRIEF DESCRIPTION OF THE DRAWINGS

FIG. 25 is a perspective view of an interval forming unit according to a fourteenth embodiment.

DESCRIPTION OF EXEMPLARY EMBODIMENTS

Figure 1:
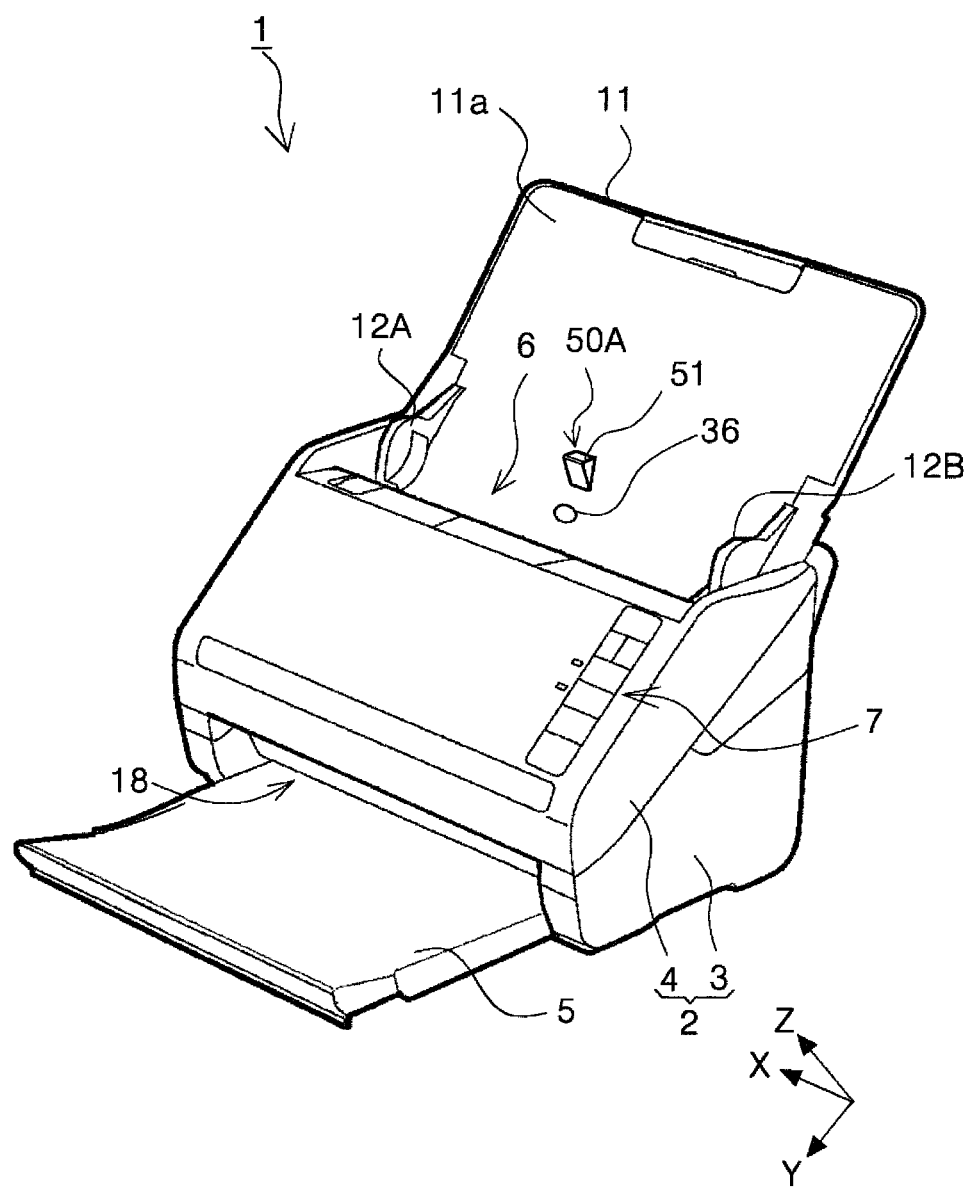
FIG. 1 is an external perspective view of a scanner.

Hereinafter, the present disclosure will be schematically described.

A medium feeding device according to a first aspect includes: a medium mounting section that forms a medium mounting surface on which a medium is mounted; a feeding unit that feeds a lowest medium among media mounted on the medium mounting section in a feeding direction by coming into contact with the lowest medium; a separation unit that separates the medium with the feeding unit; an operation detection unit that is disposed at a position facing a surface of the medium in the medium mounting section and detects at least a movement of the medium in the feeding direction; a control unit that stops feeding of the medium based on a detection value received from the operation detection unit; and an interval forming unit that is provided upstream of the operation detection unit in the feeding direction and forms a detection interval in the feeding direction by the operation detection unit between a trailing end of a first medium which is the lowest medium fed by the feeding unit among media mounted on the medium mounting section and a trailing end of a second medium which is bound with the first medium and stacked on the first medium.

According to this aspect, the interval forming unit, which forms the detection interval in the feeding direction by the operation detection unit between the trailing end of the first medium and the trailing end of the second medium, is provided upstream of the operation detection unit. Therefore, feeding abnormality can be appropriately detected by the operation detection unit by forming the detection interval.

In a second aspect, according to the first aspect, the interval forming unit is configured to include a protrusion that projects upward from the medium mounting surface.

According to this aspect, since the interval forming unit is configured to include the protrusion that projects upward from the medium mounting surface, the trailing end of the second medium is caught by the protrusion. Therefore, the detection interval can be formed appropriately.

In a third aspect, according to the second aspect, an upper end of the protrusion is formed with an R surface.

According to this aspect, since the upper end of the protrusion is formed with the R surface, it is possible to suppress that the protrusion is damaged by coming into contact with the surface of the medium to be fed.

In a fourth aspect, according to the second or third aspect, the protrusion is provided to be displaceable in a direction intersecting with the medium mounting surface, and is pressed in a direction of projecting from the medium mounting surface.

According to this aspect, the protrusion is provided to be displaceable in the direction intersecting with the medium mounting surface, and is pressed in the direction of projecting from the medium mounting surface. Therefore, when the surface of the medium to be fed is pressed strongly against the protrusion, the protrusion can sink, and it is possible to suppress that the protrusion is damaged by coming into contact with the surface of the medium to be fed.

In addition, the case where the surface of the medium to be fed presses strongly against the protrusion is a case where a stacking amount of the media is large, and in this case, the second medium is pressed from above. Therefore, a phenomenon that the second medium is bulged upward is suppressed. As a result, the trailing end of the second medium is easily separated from the trailing end of the first medium, and the detection interval is easily formed. That is, even if the protrusion sinks, it can be expected that the detection interval is formed well.

In a fifth aspect, according to the first aspect, the interval forming unit is configured to include a blowing unit that blows air upward from below the medium mounting surface.

According to this aspect, the interval forming unit is configured to include the blowing unit that blows air upward from below the medium mounting surface. Therefore, the trailing end of the second medium can be separated from the trailing end of the first medium, and the detection interval can be formed.

In a sixth aspect, according to the first aspect, the interval forming unit is configured to include an eaves portion that is disposed to face the medium mounting surface and abuts against a bulge portion of the second medium which is bulged upward.

According to this aspect, the interval forming unit is configured to include the eaves portion that is disposed to face the medium mounting surface and abuts against the bulge portion of the second medium which is bulged upward. Therefore, by pressing the upward bulge formed in the second medium by the eaves portion, the trailing end of the second medium is easily separated from the trailing end of the first medium, and the detection interval can be formed. In addition, it is possible to suppress that the trailing end of the second medium rises from the medium mounting surface.

In a seventh aspect, according to the sixth aspect, the eaves portion has a shape that tapers upstream in the feeding direction when the medium mounting surface is viewed in a plan view.

According to this aspect, the eaves portion has the shape that tapers upstream in the feeding direction when the medium mounting surface is viewed in a plan view. Therefore, when the bulge formed in the second medium abuts against the eaves portion, a degree of freedom of a posture change of the bulge is improved, and the detection interval is easily formed.

In an eighth aspect, according to the sixth aspect, the eaves portion has a recess portion that is recessed toward a downstream region in the feeding direction when the medium mounting surface is viewed in a plan view.

According to this aspect, the eaves portion has the recess portion that is recessed toward the downstream region in the feeding direction when the medium mounting surface is viewed in a plan view. Therefore, when the medium is added to the medium mounting section, or the like, the finger can enter the recess portion, and when the medium is added to the medium mounting section, or the like, it is possible to suppress that the eaves portion is obstructed.

In a ninth aspect, according to the sixth aspect, an edge guide is further provided, which guides an end of the medium mounted on the medium mounting surface in a width direction that is a direction intersecting with the feeding direction and is displaceable in the width direction, and the eaves portion is provided in the edge guide.

According to this aspect, since the eaves portion is provided in the edge guide, when the medium is added to the medium mounting section, or the like, it is possible to suppress that the eaves portion is obstructed.

In a tenth aspect, according to the first aspect, the interval forming unit is configured to include a blowing unit that blows air upstream from a downstream region in the feeding direction with respect to a bulge portion of the second medium which is bulged upward.

According to this aspect, the interval forming unit is configured to include the blowing unit that blows air upstream from the downstream region in the feeding direction with respect to the bulge portion of the second medium which is bulged upward. Therefore, by pressing the upward bulge formed in the second medium by the blowing, the trailing end of the second medium is easily separated from the trailing end of the first medium, and the detection interval can be formed. In addition, it is possible to suppress that the trailing end of the second medium rises from the medium mounting surface.

A medium feeding device according to an eleventh aspect includes: a medium mounting section that forms a medium mounting surface on which a medium is mounted; a feeding unit that feeds a lowest medium among media mounted on the medium mounting section in a feeding direction by coming into contact with the lowest medium; a separation unit that separates the medium with the feeding unit; an operation detection unit that is disposed at a position facing a surface of the medium in the medium mounting section and detects at least a movement of the medium in the feeding direction; a control unit that stops feeding of the medium based on a detection value received from the operation detection unit; and a curve forming portion that is provided upstream of the operation detection unit in the feeding direction, and forms a curve in the feeding direction on the medium mounted on the medium mounting section.

An interval is formed between a trailing end of the lowest first medium which is fed by the feeding unit among media mounted on the medium mounting section and a trailing end of a second medium which is bound with the first medium and stacked on the first medium. Therefore, for example, the second medium is curved in the feeding direction and needs to be bulged appropriately upward. However, when the medium mounted on the medium mounting section is in a state of being difficult to curve in the feeding direction, specifically, when the medium is curved in a width direction that is a direction intersecting with the feeding direction and the rigidity in the feeding direction is increased, the second medium cannot be appropriately curved in the feeding direction, and the trailing end of the second medium cannot advance downstream. As a result, there is a possibility that the trailing end of the second medium cannot be detected by the operation detection unit.

However, according to this aspect, the curve forming portion that forms the curve in the feeding direction on the medium mounted on the medium mounting section, upstream of the operation detection unit in the feeding direction. Therefore, the trailing end of the second medium can appropriately advance downstream.

An image reading apparatus according to a twelfth aspect includes: a reading unit that reads a medium; and the medium transport device according to any one of the first to eleventh aspect, which transports the medium toward the reading unit.

According to this aspect, in the image reading apparatus, the operational effect of any of the above-described first to eleventh aspects can be obtained.

Hereinafter, the present disclosure will be described specifically.

Hereinafter, an embodiment of an image reading apparatus will be described with reference to the drawings. In the present embodiment, as an example of the image reading apparatus, a document scanner (hereinafter, simply referred to as a scanner) capable of reading at least one of front and back surfaces of a document, which is an example of a medium, will be described. Hereinafter, the document is referred to as a document P.

An XYZ coordinate system illustrated in each drawing is an orthogonal coordinate system, in which an X-axis direction is an apparatus width direction and a document width direction that is a direction intersecting with a document transporting direction. In addition, a Y-axis direction is the document transporting direction. The Y-axis direction forms an inclination angle with respect to the horizontal. A Z-axis direction is a direction orthogonal to the Y-axis direction, and generally indicates a direction orthogonal to a surface of the transported document.

Downstream in the feeding direction and the transporting direction of the document P is a +Y direction, and upstream is a −Y direction.

FIG. 1 is an external perspective view of a scanner 1. The scanner 1 includes an apparatus main body 2 having a reading section 20 (FIG. 2) reading an image of the document P therein.

The apparatus main body 2 is configured to include a lower unit 3 and an upper unit 4. The upper unit 4 is provided to be opened and closed by rotating about a rotation shaft (not illustrated) provided in the +Y direction with respect to the lower unit 3, an inside of the apparatus is exposed by opening the upper unit 4 in a front direction of the apparatus, and jam of the document P can be cleared.

On the back surface of the apparatus main body 2, a document mounting section 11 having a mounting surface 11*a*, on which the document P to be fed, is mounted is provided.

In addition, the document mounting section 11 is provided with a pair of edge guides specifically, edge guides 12A and 12B, for guiding side edges of the mounted document P in the width direction. The edge guides 12A and 12B are provided to be displaceable in the X-axis direction.

The apparatus main body 2 includes an operation panel 7 on an apparatus front surface of the upper unit 4 for performing various reading settings and reading execution operations.

An upper portion of the upper unit 4 is provided with a feeding port 6 connected to an inside of the apparatus main body 2, and the document P mounted on the document mounting section 11 is sent toward a reading section 20 by a document feeding device 10 which is described later. The read document P is discharged toward a discharge tray 5 from a discharge port 18 provided on a front surface of the lower unit 3.

Next, a document feeding path in the scanner 1 will be described with reference to FIGS. 2 and 3. The scanner 1 includes the document feeding device 10. The document feeding device 10 includes the document mounting section 11, a feeding roller 14 as an example of a feeding unit, a separation roller 15 as an example of a separation unit, a control section 40 (see FIG. 4) as an example of a control unit, and a two-dimensional sensor 36 as an example of an operation detection unit. In addition, the document feeding device 10 can be regarded as a device having a function related to document reading from the scanner 1, specifically, a device in which a reading section 20 described later is omitted. However, even if the reading section 20 is provided, the scanner 1 itself can be regarded as a document feeding device from the viewpoint of document feeding.

Figure 2:
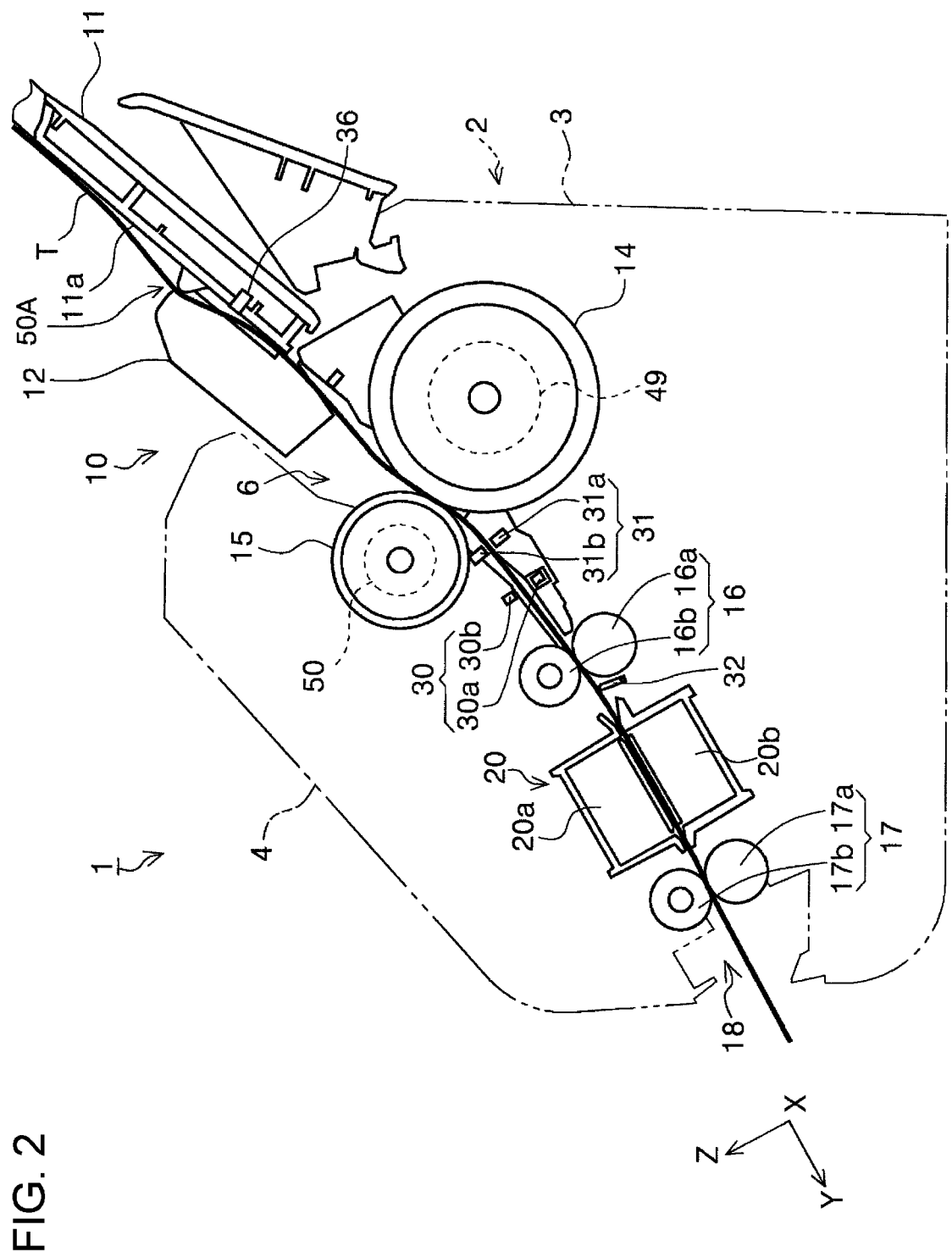
FIG. 2 is a side sectional view of a document transporting path of the scanner.

In FIG. 2, a solid line indicated by a reference numeral T indicates a document feeding path, in other words, a passage path of the document P. The document feeding path T is formed by a space sandwiched between the lower unit 3 and the upper unit 4.

The document mounting section 11 is provided in most upstream of the document feeding path T. The feeding roller 14 that sends the document P mounted on the mounting surface 11a of the document mounting section 11 toward the reading section 20 and the separation roller 15 that nips and separates the document P with the feeding roller 14 are provided downstream of the document mounting section 11.

The feeding roller 14 comes into contact with a lowest document of the documents P mounted on the mounting surface 11a of the document mounting section 11. Therefore, when a plurality of documents P are set in the document mounting section 11 in the scanner 1, the documents P are fed sequentially downstream from the document P on a mounting surface 11a side.

Figure 3:
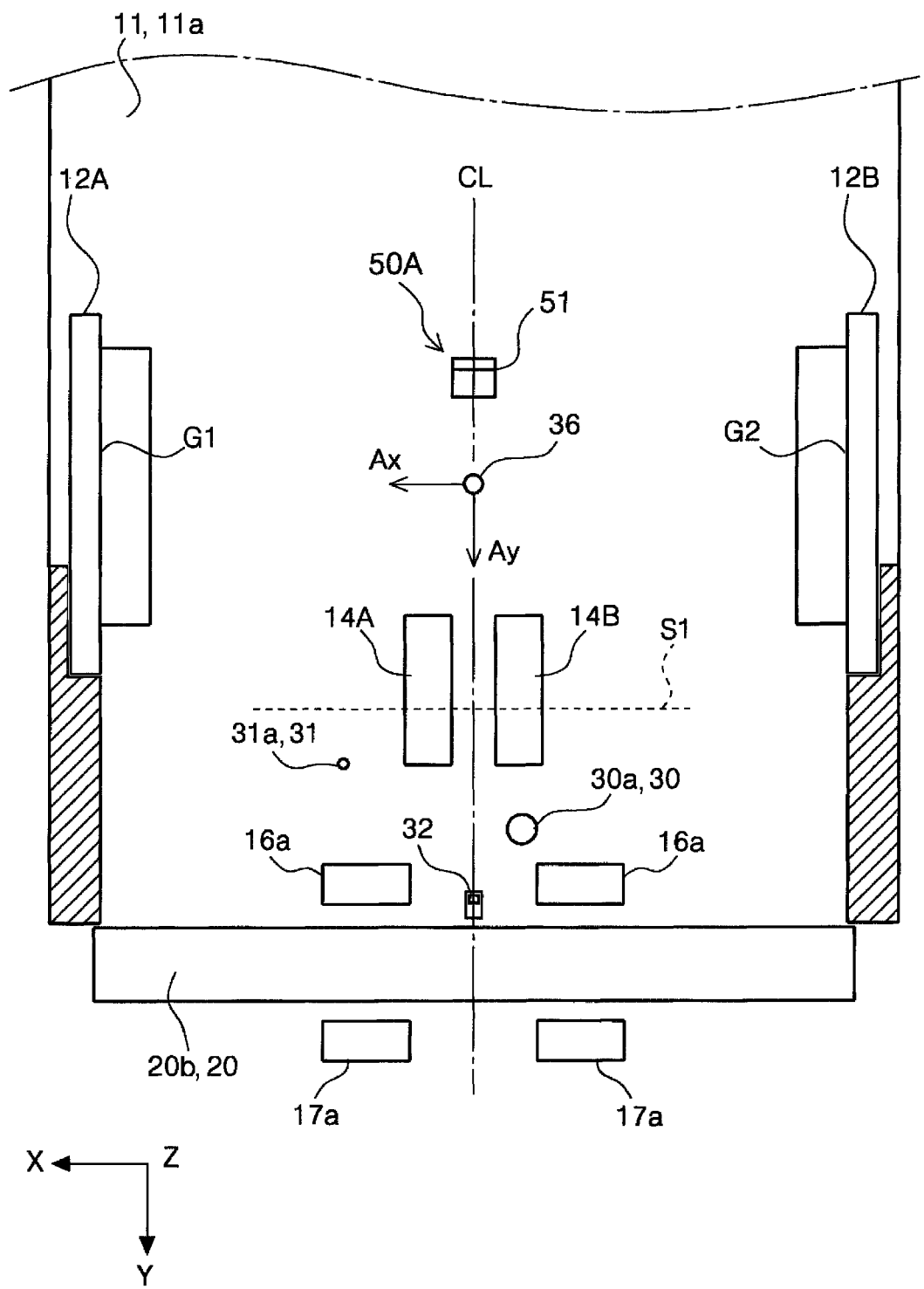
FIG. 3 is a plan view of the document transporting path of the scanner.

In the present embodiment, as illustrated in FIG. 3, the feeding rollers 14 are symmetrically disposed with respect to a center position CL in the document width direction. In FIG. 3, the feeding roller 14 on a left side with respect to the center position CL is denoted by reference numeral 14A, and the feeding roller on a right side with respect to the center position CL is denoted by reference numeral 14B. Similarly, although not illustrated in FIG. 3, the separation roller 15 also configures of a separation roller 15A on the left side and a separation roller 15B on the right side with respect to the center position CL (see FIGS. 5 and 6). In FIG. 3, a broken line S1 indicates a document nip position between the feeding roller 14 and the separation roller 15.

Figure 4:
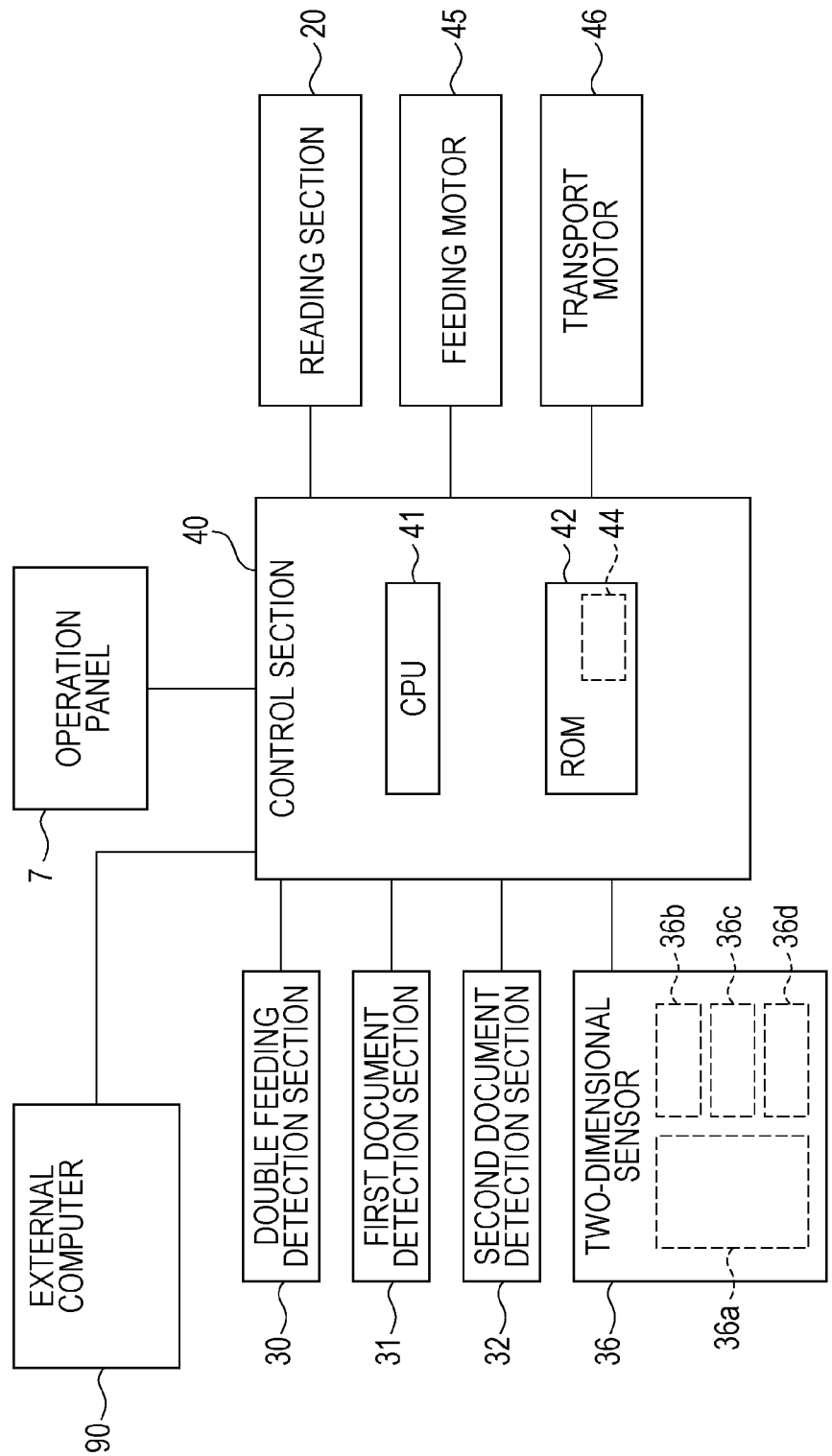
FIG. 4 is a block diagram illustrating a control system of the scanner.

The feeding roller 14 is driven to rotate by a feeding motor 45 (FIG. 4). With a rotation torque obtained from the feeding motor 45, the feeding roller 14 rotates in a counterclockwise direction in FIG. 2.

A driving force of the feeding motor 45 is transmitted to the feeding roller 14 via a one-way clutch 49. The feeding roller 14 receives a rotation torque from the feeding motor 45 and rotates in the counterclockwise direction in FIG. 2, that is, in a forward rotation direction, to feed the document P downstream.

Since the one-way clutch 49 is provided in a driving force transmission path between the feeding roller 14 and the feeding motor 45 (FIG. 4), even if the feeding motor 45 reversely rotates, the feeding roller 14 does not reversely rotate. In a state where the feeding motor 45 is stopped, the feeding roller 14 is in contact with the transported document P and can be driven to be rotated in the forward rotation direction.

For example, when a leading end of the document P is detected by a second document detection section 32 disposed downstream of a transport roller pair 16, the control section 40 stops driving of the feeding motor 45 and drives only the transport motor 46. Therefore, the document P is transported by the transport roller pair 16, and the feeding roller 14 is driven to be rotated in the forward rotation direction by coming into contact with the transported document P.

Next, the rotation torque is transmitted from the transport motor 46 (FIG. 4) to the separation roller 15 via a torque limiter 50. During the feeding operation of the document P, a driving torque for rotating the separation roller 15 in the reverse rotation direction (counterclockwise direction in FIG. 2) is transmitted from the transport motor 46 (FIG. 4) to the separation roller 15.

When the document P is not interposed between the feeding roller 14 and the separation roller 15 or when only one sheet is interposed, the rotation torque for rotating the separation roller 15 in the forward rotation direction (clockwise direction in FIG. 2) exceeds a limit torque of the torque limiter 50, thereby causing a slippage in the torque limiter 50. Therefore, the separation roller 15 is driven to be rotated in the forward rotation direction regardless of the rotation torque received from the transport motor 46 (FIG. 4).

On the other hand, when the second and subsequent documents P enter between the feeding roller 14 and the separation roller 15 in addition to the document P to be fed, slippage occurs between the documents, and the separation roller 15 reversely rotates by the driving torque received from the transport motor 46 (FIG. 4). Therefore, the second and subsequent documents P to be double-fed are returned to upstream, that is, double feeding is prevented.

Outer peripheral surfaces of the feeding roller 14 and the separation roller 15 are formed of an elastic material such as elastomer, and when a friction coefficient between the feeding roller 14 and the separation roller 15 is $\mu1$, a friction coefficient between the documents is $\mu2$, a friction coefficient between the feeding roller 14 and the document P is $\mu3$, and a friction coefficient between the separation roller 15 and the document P is $\mu4$, a relationship of $\mu1>\mu2$ is established. Further, a relationship of $\mu1>\mu3$, $\mu4$ is established. Further, a relationship of $\mu2<\mu3$, $\mu4$ is established. Further, a relationship of $\mu4>\mu3$ is established.

Next, the transport roller pair 16, the reading section 20 for reading an image, and a discharge roller pair 17 are provided downstream of the feeding roller 14. The transport roller pair 16 includes a transport drive roller 16a that is rotationally driven by the transport motor 46 (FIG. 4) as a transport motor, and a transport driven roller 16b that is driven to be rotated. In the present embodiment, as illustrated in FIG. 3, two transport drive rollers 16a are disposed to be symmetrical with respect to the center position CL. Although not illustrated in FIG. 3, the transport driven rollers 16b are similarly disposed to be symmetrical with respect to the center position CL.

The document P nipped by the feeding roller 14 and the separation roller 15 and fed downstream is nipped by the transport roller pair 16 and transported to the reading section 20 located downstream of the transport roller pair 16. That is, the transport roller pair 16 is an example of a sending unit that sends the document P downstream.

The reading section 20 includes an upper reading sensor 20a provided on the upper unit 4 side and a lower reading sensor 20b provided on the lower unit 3 side. In the present embodiment, the upper reading sensor 20a and the lower reading sensor 20b are configured as a contact type image sensor module (CISM) as an example.

The document P is read by the reading section 20 on at least one of the front surface and the back surface of the document P, and then is nipped by the discharge roller pair 17 located downstream of the reading section 20, and is discharged from a discharge port 18 provided on the apparatus front surface of the lower unit 3.

The discharge roller pair 17 is configured to include a discharge drive roller 17a that is driven to rotate by the transport motor 46 (FIG. 4), and a discharge driven roller 17b that is driven to be rotated. As illustrated in FIG. 3, in the present embodiment, two discharge drive rollers 17a are disposed to be symmetrical with respect to the center position CL. Similarly, although not illustrated in FIG. 3, two discharge driven rollers 17b are disposed to be symmetrical with respect to the center position CL.

Hereinafter, a control system in the scanner 1 will be described with reference to FIG. 4. FIG. 4 is a block diagram illustrating the control system of the scanner 1 according to the present disclosure.

In FIG. 4, the control section 40 as the control unit performs various other controls of the scanner 1 including feeding, transporting, discharging control, and reading control of the document P. A signal from the operation panel 7 is input to the control section 40.

The control section 40 controls the feeding motor 45 and the transport motor 46. As described above, the feeding motor 45 is a drive source of the feeding roller 14 illustrated in FIG. 2, and the transport motor 46 is a drive source of the separation roller 15, the transport roller pair 16, and the discharge roller pair 17 illustrated in FIG. 2. Both the feeding motor 45 and the transport motor 46 are DC motors in the present embodiment.

Read data from the reading section 20 is input to the control section 40, and a signal for controlling the reading section 20 is transmitted from the control section 40 to the reading section 20.

The control section 40 also receives signals from the two-dimensional sensor 36, a double feeding detection section 30, a first document detection section 31, a second document detection section 32, and other detection units described below.

The control section 40 also receives detection values of an encoder that detects a rotation amount of the feeding motor 45 and an encoder that detects rotation amounts of the transport drive roller 16a and the discharge drive roller 17a. Therefore the control section 40 can detect a feeding amount of the document by each roller.

The control section 40 includes a CPU 41 and a flash ROM 42. The CPU 41 performs various arithmetic processes according to a program 44 stored in the flash ROM 42 and controls operations of the entire scanner 1. The flash ROM, which is an example of a storage section, is a readable and writable non-volatile memory, and stores data or the like necessary for abnormality determination described later. Unless otherwise specified in the present specification, all data necessary for the abnormality determination, parameters necessary for control, and the like, which will be described later, are stored in the flash ROM 42, and the values are updated by the control section 40 as necessary. Various setting information input by a user via the operation panel 7 is also stored in the flash ROM 42.

The program 44 stored in the flash ROM 42 does not necessarily mean one program, but is configured of a plurality of programs, and includes a program for determining abnormality in the document feeding path T, various control programs for transporting and reading the document P, and the like.

The scanner 1 is configured to be coupled to an external computer 90, and information is input to the control section 40 from the external computer 90. The external computer 90 includes a display section (not illustrated). In the display section, a user interface (UI) is realized by a control program stored in a storage unit (not illustrated) included in the external computer 90.

Next, each detection unit provided on the document feeding path T will be described.

First, the two-dimensional sensor 36 is provided in the document mounting section 11 as the operation detection unit. The two-dimensional sensor 36 faces the lowest document among the documents P mounted on the document mounting section 11.

The two-dimensional sensor 36 is a sensor based on a same or similar principle as a sensor capable of detecting a movement of a detection target in a two-dimensional coordinate system used for a computer mouse, and includes a controller 36a, a light source 36b, a lens 36c, and an image sensor 36d.

The light source 36b is a light source for irradiating the document P mounted on the document mounting section 11 with light via the lens 36c, and can adopt, for example, a light source such as a red LED, an infrared LED, a laser, or a blue LED. In the present embodiment, laser light is adopted. The light source 36b can switch between a light emitting state and a non-light emitting state under the control of the control section 40.

The lens 36c guides and emits light emitted from the light source 36b toward the document P mounted on the document mounting section 11.

The image sensor 36d is a sensor that receives reflected light from the document P mounted on the document mounting section 11, and may use an image sensor such as a CMOS or a CCD. The image sensor 36d is formed by arranging pixels in a first axis Ax direction and a second axis Ay direction orthogonal to the first axis Ax direction.

In the present specification, the "first axis Ax direction" does not mean only one of a +Ax direction and a −Ax direction, but includes both. Similarly, the "second axis Ay direction" does not mean only one of a +Ay direction and a −Ay direction, but includes both.

The controller 36a analyzes an image acquired by the image sensor 36d, and outputs a moving distance of the image in the first axis Ax direction and a moving distance of the image in the second axis Ay direction as detection values. As an image analysis method by the controller 36a, a known method used for the computer mouse can be used.

As will be described later in detail, the control section 40 that acquires the detection values in the first axis Ax direction and the second axis Ay direction from the two-dimensional sensor 36 determines a state of the document P mounted on the document mounting section 11 using the acquired detection values. The two-dimensional sensor 36 according to the present embodiment outputs the moving distance of the image in the first axis Ax direction and the moving distance of the image in the second axis Ay direction to the control section 40, and the output values are reset zero by an initialization instruction by the control section 40.

Although the two-dimensional sensor 36 is described as an optical type as an example, the two-dimensional sensor 36 may be a mechanical type, more specifically, a sensor including a trackball, a rotary encoder for detecting rotation of the trackball in the first axis Ax direction, and a rotary encoder for detecting rotation of the trackball in the second axis Ay direction.

In addition, from the viewpoint of detecting a bound document described later, the operation detection unit is not necessarily limited to the two-dimensional sensor, and may be one that can detect only the second axis Ay direction.

The first document detection section 31 is provided downstream of the feeding roller 14. The first document detection section 31 is configured as an optical sensor as an example and, as illustrated in FIG. 2, is configured to include a light emitting portion 31a and a light receiving portion 31b that are disposed to face each other with the document feeding path T interposed therebetween. The light receiving portion 31b transmits an electric signal indicating intensity of the detection light, to the control section 40 (FIG. 4). The document P to be transported blocks the detection light emitted from the light emitting portion 31a, so that the electric signal indicating the intensity of the detection light changes. Therefore, the control section 40 can detect the passage of the leading end or the trailing end of the document P.

The double feeding detection section 30 for detecting double feeding of the document P is disposed downstream of the first document detection section 31. As illustrated in FIG. 2, the double feeding detection section 30 is configured to include an ultrasonic wave transmitting portion 30a and an ultrasonic wave receiving portion 30b for receiving ultrasonic waves, which are disposed to face each other with the document feeding path T interposed therebetween. The ultrasonic wave receiving portion 30b transmits an output value corresponding to the intensity of the detected ultrasonic waves, to the control section 40. When the double feeding of the document P occurs, the electric signal indicating the intensity of the ultrasonic wave changes, whereby the control section 40 can detect the double feeding of the document P.

The second document detection section 32 is provided downstream of the double feeding detection section 30. The second document detection section 32 is configured as a contact-type sensor having a lever, and when the lever rotates as the leading end or the trailing end of the document P passes the sensor, an electric signal sent from the second document detection section 32 to the control section 40 changes. Therefore, the control section 40 can detect the passage of the leading end or the trailing end of the document P. The control section 40 can grasp a position of the document P on the document feeding path T by the first document detection section 31 and the second document detection section 32 described above.

Subsequently, an abnormality determination related to the feeding of the document P using the two-dimensional sensor 36 will be described. The scanner 1 according to the present embodiment determines a feeding abnormality based on a detection value of the two-dimensional sensor 36, and stops feeding and transport of the document P as occurrence of the feeding abnormality when a predetermined condition is satisfied. In the present embodiment, specifically, the feeding motor 45 (FIG. 4) and the transport motor 46 (FIG. 4) are stopped.

As described above, the two-dimensional sensor 36 includes the image sensor 36d which is formed by arranging pixels in the first axis Ax direction and the second axis Ay direction orthogonal to the first axis Ax direction, and as illustrated in FIG. 3, the first axis Ax is set to face the X direction, and the second axis Ay is set to face the Y direction.

An example of a feeding abnormality is skew of the document P and when the skew causes a component in the X direction in the moving direction of the document P, a change in speed in the first axis Ax direction directly reflects the component.

Therefore, the control section 40 can determine the feeding abnormality based on the detection value of the two-dimensional sensor 36 in the first axis Ax direction, that is, the moving distance of the image in the first axis Ax direction. When the feeding abnormality is determined, feeding and transport of the document P are stopped. More specifically, the feeding motor 45 (FIG. 4) and the transport motor 46 (FIG. 4) are stopped.

Further, as an example of the feeding abnormality, there is an abnormality caused by a plurality of documents P being set on the document mounting section 11 and fed while being bound by a stapler or the like. Hereinafter, this will be described with reference to FIGS. 5 and 6.

Figure 5:
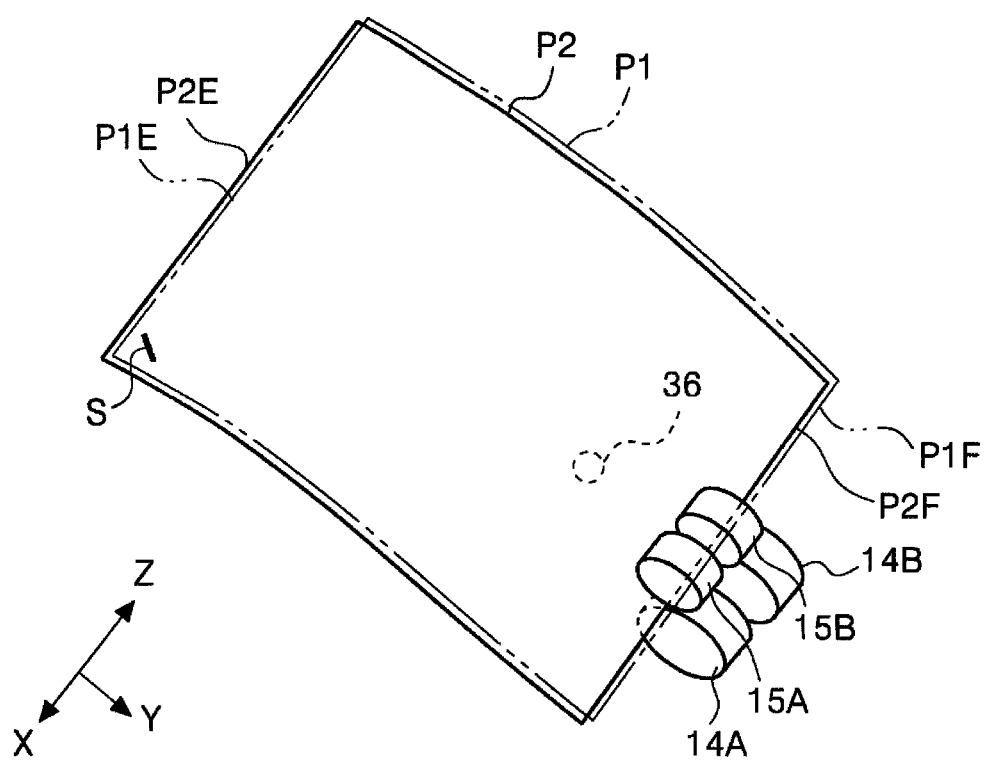
FIG. 5 is a schematic view illustrating a phenomenon that occurs when a document bound by a binding needle is fed.
Figure 6:
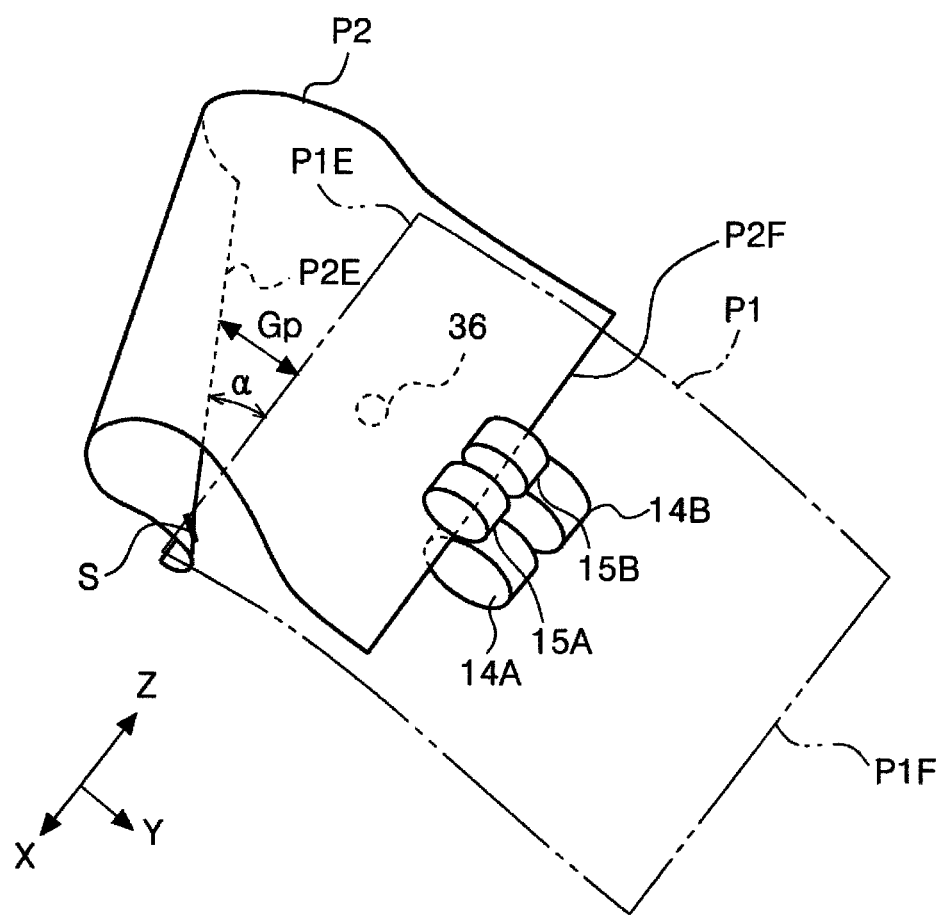
FIG. 6 is a schematic view illustrating a phenomenon that occurs when a document bound by the binding needle is fed.

In FIGS. 5 and 6, reference numeral P1 indicates the lowest document fed by coming into contact with the feeding roller 14, and reference numeral P2 indicates the document stacked thereon. Hereinafter, the lowest document indicated by reference numeral P1 is referred to as a first document P1, and the document stacked thereon is referred to as a second document P2. The first document P1 is indicated by a two-dot chain line, and the second document P2 is indicated by a solid line.

In FIGS. 5 and 6, reference numeral P1F indicates a downstream end of the first document P1 in the feeding direction, that is, the leading end, and reference numeral P1E indicates an upstream end in the feeding direction, that is, the trailing end. Similarly, reference numeral P2F indicates a downstream end of the second document P2 in the feeding direction, that is, the leading end, and reference numeral P2E indicates an upstream end in the feeding direction, that is, the trailing end.

The first document P1 and the second document P2 are bound by a binding needle S at a corner in the +X direction upstream in the feeding direction. In this state, when the first document P1 is fed downstream in the feeding direction by the feeding roller 14, only the trailing end P2E of the second document P2 advances downstream in a state where the leading end P2F is stopped in the separation roller 15. Therefore, as illustrated in FIG. 6, the second document P2 bulges upward, a trailing end area is inversed, and an interval Gp in the Y-axis direction is formed between the trailing end P2E of the second document P2 and the trailing end P1E of the first document P1. The interval between the trailing end P2E of the second document P2 and the trailing end P1E of the first document P1 differs depending on the position in the X-axis direction. The interval Gp illustrated in FIG. 6 is an interval at a position at which of the two-dimensional sensor 36 is disposed in the X-axis direction.

The interval Gp can be detected when the moving distance in the second axis Ay direction in the two-dimensional sensor 36 is zero. when such an interval Gp is detected, the document feeding can be stopped as the feeding abnormality, that is, the bound document is fed.

Figure 7:
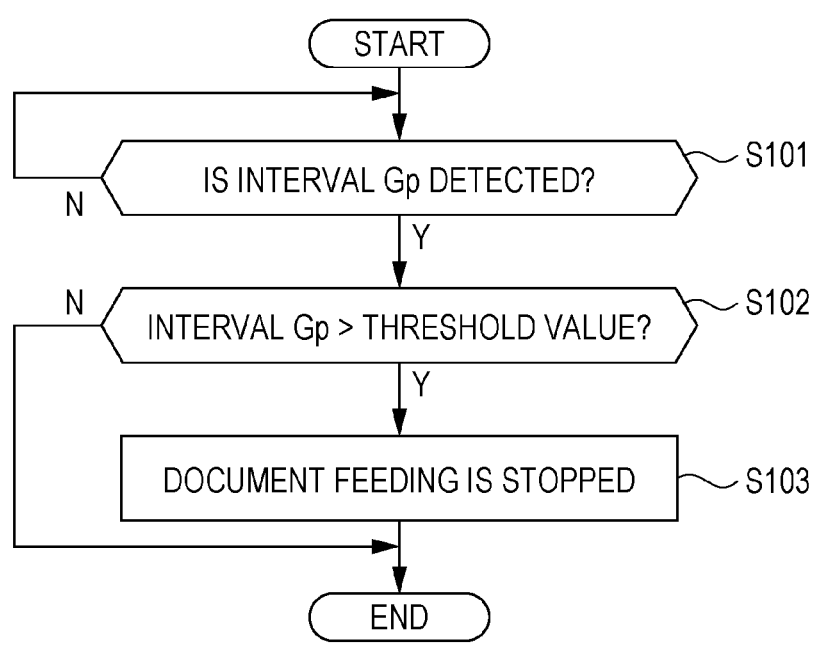
FIG. 7 is a flowchart illustrating a flow of an abnormality determination process.

Hereinafter, in this case, control of the control section 40 (see FIG. 4) will be described with reference to FIG. 7. When the control section 40 detects the interval Gp (step S101), it is determined whether or not the interval Gp exceeds a predetermined threshold value (step S102). When the interval Gp exceeds the predetermined threshold value (Yes in step S102), the document feeding is stopped as the feeding abnormality, that is, the feeding motor 45 (see FIG. 4) and the transport motor 46 (see FIG. 4) are stopped (step S103).

The threshold value in step S102 can be determined in consideration of, for example, a size of a punch hole or the like. That is, there is a case where the punch hole is formed in the document P, and when the interval Gp corresponds to the punch hole, there is a possibility that the feeding is not abnormal in such a case. Therefore, in this case, it is not determined that the feeding is abnormal.

As described above, it can be detected that the bound document is fed based on the interval Gp. However, even if a plurality of documents are bound, there is a possibility that the trailing end P1E of the first document P1 and the trailing end P2E of the second document P2 advance downstream in the feeding direction while the interval Gp is not formed, the interval Gp is formed only slightly even if the interval Gp is formed, the interval Gp cannot be detected by the two-dimensional sensor 36, or as described above, it is determined that the punch hole or the like has passed.

That is, in order to detect that the document is bound, it is preferable that the interval Gp is secured to a predetermined value or more. Such an interval is hereinafter referred to as a detection interval Gr. That is, the interval Gp is preferably equal to or longer than the detection interval Gr.

The detection interval Gr is preferably formed to be, for example, 10 mm or more in order to distinguish the detection interval Gr from punch hole. If the detection interval Gr is too long, the determination of the feeding abnormality is delayed or the determination of the feeding abnormality cannot be made, and the document may be damaged. Therefore, an angle α formed by the trailing end P1E of the first document P1 and the trailing end P2E of the second document P2 is preferably 40° or less.

Therefore, in the scanner 1, an interval forming unit for forming the interval Gp equal to or longer than the detection interval Gr is provided between the trailing end P1E of the first document P1 and the trailing end P2E of the second document P2. Hereinafter, a plurality of embodiments of the interval forming unit will be described. FIGS. 1 and 2 illustrate an interval forming unit 50A according to a first embodiment as an example. The interval forming unit 50A and the interval forming unit according to the other embodiments are both provided upstream of the two-dimensional sensor 36 in the feeding direction. With such an interval forming unit, the interval Gp equal to or longer than the detection interval Gr can be formed, and the feeding abnormality can be appropriately detected.

In the drawings illustrating the respective embodiments described below, the same reference numerals denote the same components, dimensions, and the like, and redundant description will be avoided.

First Embodiment

Hereinafter, the interval forming unit 50A according to the first embodiment will be described with reference to FIGS. 9 and 10.

The interval forming unit 50A is configured to include a protrusion 51 projecting upward from the mounting surface 11a. Therefore, the trailing end P2E of the second document P2 is caught by the protrusion 51, so that the interval Gp equal to or longer than the detection interval Gr can be appropriately formed.

An example of the movement when the trailing end P2E of the second document P2 is caught by the protrusion 51 will be specifically described. When the feeding of the first bound document P1 is started, as described above with reference with FIG. 6, the second document P2 bulges upward, and the trailing end P2E of the second document P2 is caught by the protrusion 51, and the movement thereof in the +Y direction is temporarily stopped, thereby increasing the interval Gp. Then, when the first document P1 is further fed, the trailing end P2E of the second document P2 climbs an upstream surface 51a of the protrusion 51, and eventually comes off the protrusion 51 and can advance downstream.

Here, it is preferable that an upper end of the protrusion 51 be formed with an R surface. As described above, by forming the upper portion of the protrusion 51 with the R surface, it is possible to suppress that the protrusion 51 comes into contact with the lower surface of the fed first document P1 thereby giving a scratch to the lower surface thereof. The upper end of the protrusion 51 may be formed with a C surface in addition to the R surface.

Figure 10:
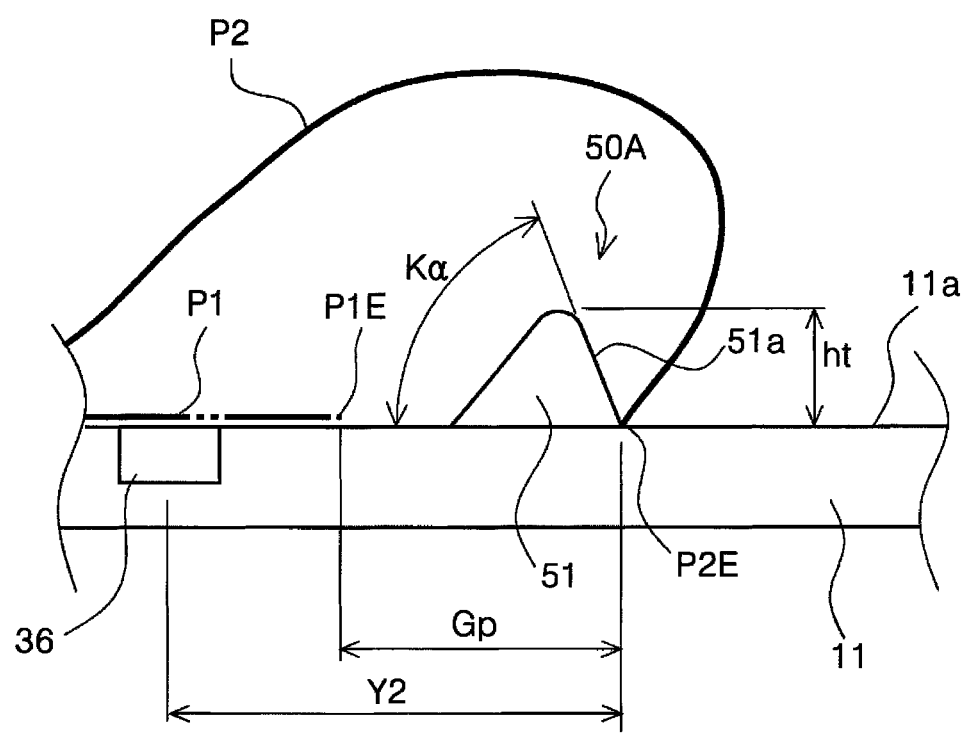
FIG. 10 is a partially enlarged view of FIG. 9.

As illustrated in FIG. 10, in the protrusion 51, it is preferable that an angle Kα formed between the upstream surface 51a by which the trailing end P2E of the second document P2 is caught and the mounting surface 11a be set within a range of, for example, 30° to 90°, and is more preferably set within a range of 45° to 80°.

Further, it is preferable that a protruding height ht from the mounting surface 11a be set to 10 mm or less.

A width of the protrusion 51 in the X-axis direction can be set in a range of substantially 3 mm to 100 mm.

In the present embodiment, the protrusion 51 is disposed at a same position as the position of the two-dimensional sensor 36 in the X-axis direction. However, the position in the X-axis direction may be slightly shifted from the position of the two-dimensional sensor 36.

A distance Y2 in the Y-axis direction between the detection position by the two-dimensional sensor 36 and a rear end of the protrusion 51 can be set to, for example, 10 mm. If the distance Y2 is too small, when the trailing end P2E of the second document P2 passes through the position of the two-dimensional sensor 36, the trailing end P2E is too far from the mounting surface 11a. Since there is a possibility that the trailing end P2E cannot be detected by the two-dimensional sensor 36, it is preferable that the distance Y2 be set in consideration of this point.

Figure 9:
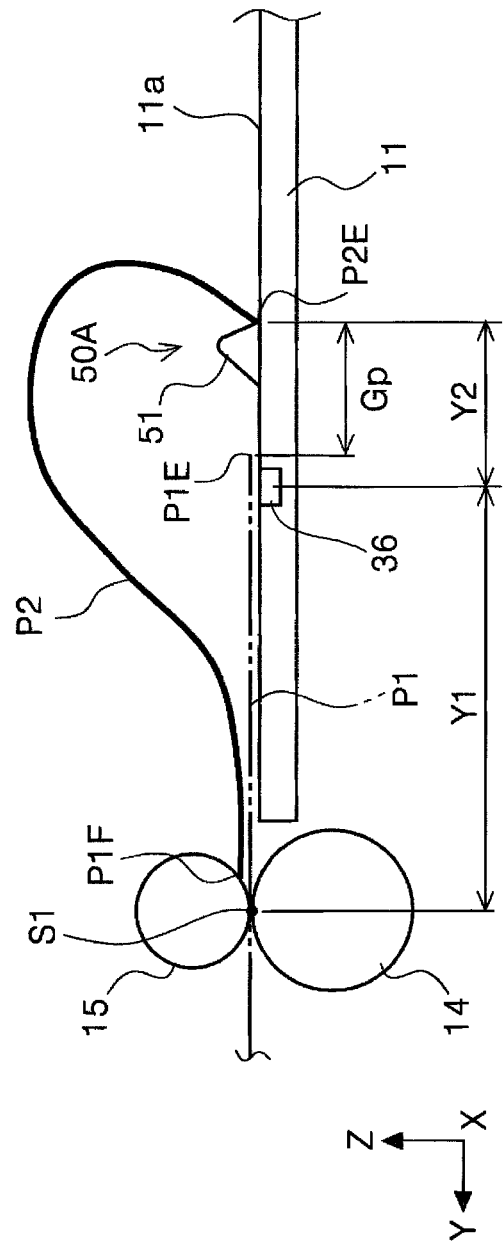
FIG. 9 is a side view of an interval forming unit according to a first embodiment.

In FIG. 9, a distance Y1 is a distance in the Y-axis direction between a document nip position S1 by the feeding roller 14 and the separation roller 15, and the detection position by the two-dimensional sensor 36, and a minimum value thereof can be set to, for example, substantially 10 mm in consideration of suppression of damage to the document P, and a maximum value can adopt a value obtained by subtracting, for example, 30 mm from a length of the document P to be detected in the Y-axis direction.

Second Embodiment

Figure 11:
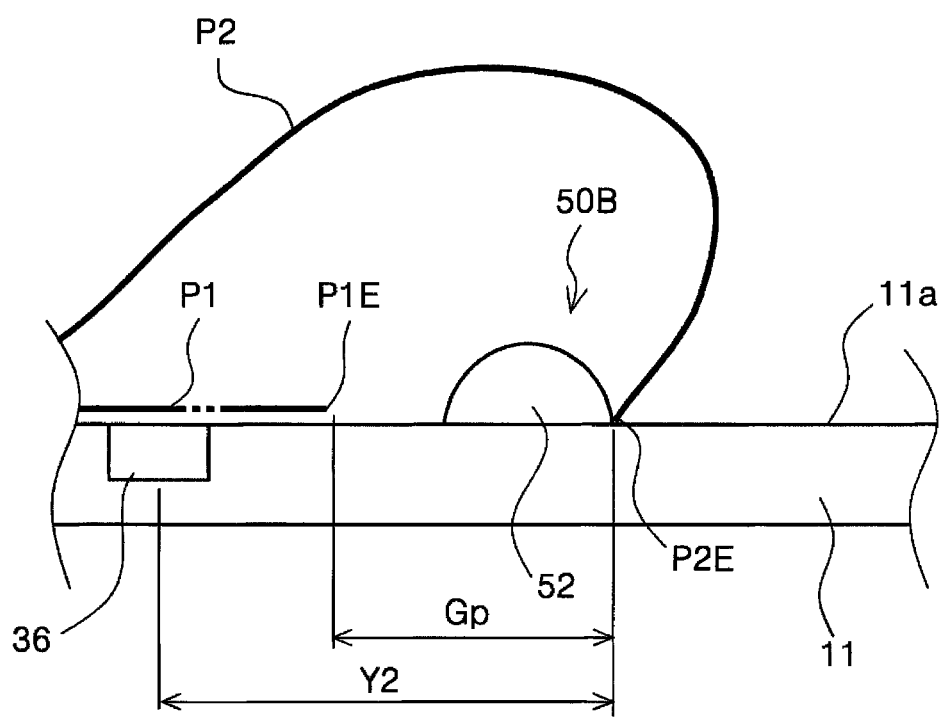
FIG. 11 is a side view of an interval forming unit according to a second embodiment.

Hereinafter, an interval forming unit 50B according to a second embodiment will be described with reference to FIG. 11. The interval forming unit 50B according to the second embodiment is configured by a protrusion as that in the first embodiment described above, but the interval forming unit 50B according to the second embodiment has a semicircular shape when viewed in a side view as illustrated in FIG. 11.

The same operational effect as those in the above-described first embodiment can be obtained by such an interval forming unit 50B.

Third Embodiment

Hereinafter, an interval forming unit 50C according to a third embodiment will be described with reference to FIG. 12. The interval forming unit 50C according to the third embodiment is configured by a protrusion similarly to those in the first and second embodiments described above, but as illustrated in FIG. 12, the interval forming unit 50C according to the third embodiment is configured to include a pedestal 54 and a roller 53. The roller 53 is provided rotatably with respect to the pedestal 54. The pedestal 54 and the roller 53 form the protrusion.

With such an interval forming unit 50C, the same operational effect as those in the above-described first and second embodiments can be obtained, and furthermore, damage of the lower surface of the first document P1 can be more reliably suppressed.

Fourth Embodiment

Figure 13:
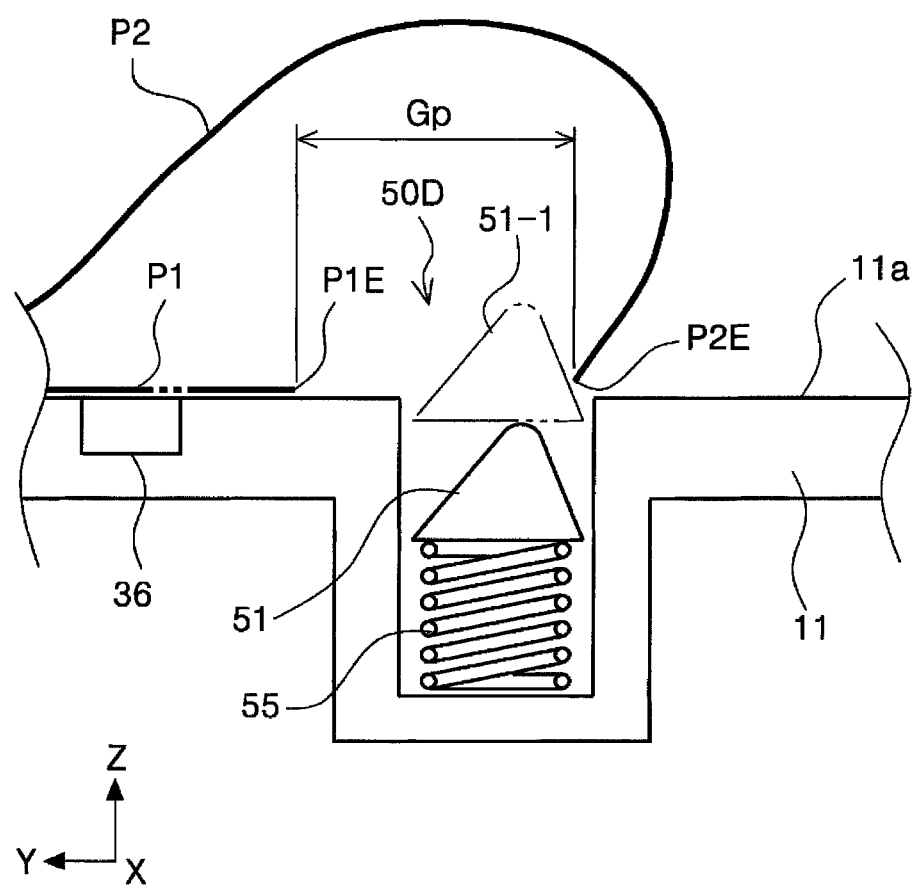
FIG. 13 is a side view of an interval forming unit according to a fourth embodiment.

Hereinafter, an interval forming unit 50D according to a fourth embodiment will be described with reference to FIG. 13. The interval forming unit 50D according to the fourth embodiment is configured by a protrusion as those in the first to third embodiments described above, but as illustrated in FIG. 13, in the interval forming unit 50D according to the fourth embodiment, a protrusion 51 is provided to be displaceable in the Z-axis direction which is a direction intersecting with the mounting surface 11a, and is pressed by a compression coil spring 55 in a projection direction from the mounting surface 11a. The protrusion indicated by a solid line and reference numeral 51 indicates a state of being retracted below from the mounting surface 11a, and the protrusion indicated by a two-dot chain line and reference numeral 51-1 indicates a state of being projected upward from the mounting surface 11a.

With such a configuration, when the lower surface of the fed first document P1 strongly presses against the protrusion 51, the protrusion 51 can sink, and it is possible to suppress that the protrusion 51 comes into contact with the lower surface of the fed first document P1 thereby causing scratches on the lower surface of the fed first document P1.

A case where the lower surface of the fed first document P1 strongly presses against the protrusion 51 is a case where a document stacking amount is large, in this case, the second document P2 is pressed from above. Therefore, a phenomenon that the second document P2 bulges upward is suppressed, as a result, the trailing end P2E of the second document P2 is easily separated from the trailing end P1E of the first document P1, and the interval Gp is easily formed. That is, it can be expected that the interval Gp is well formed even when the protrusion 51 sinks.

Figure 12:
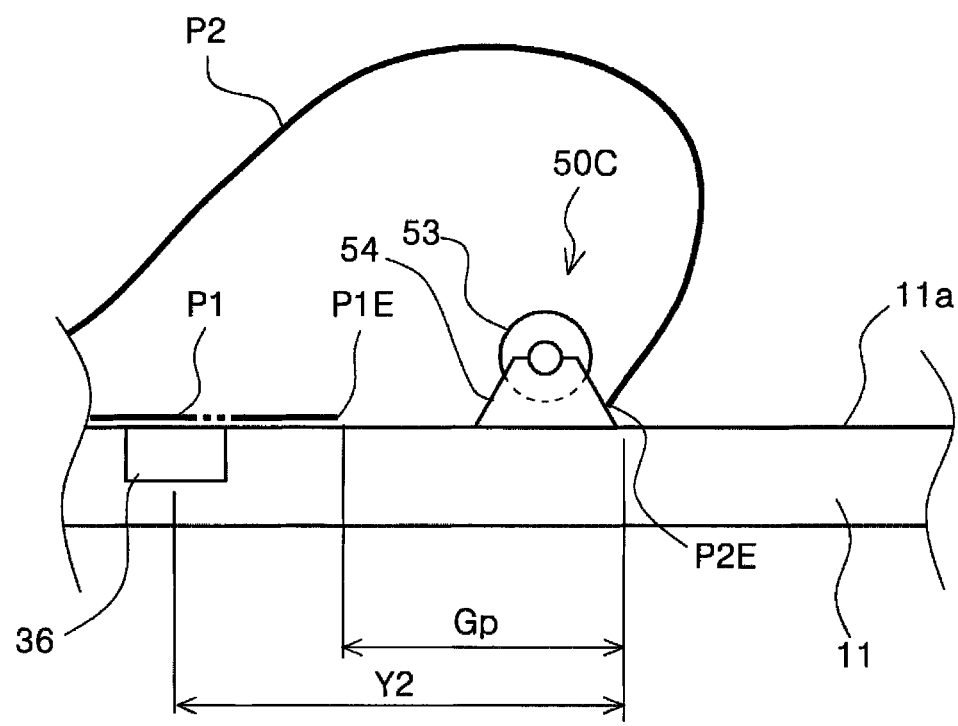
FIG. 12 is a side view of an interval forming unit according to a third embodiment.

In the present embodiment, the protrusion 51 adopts a shape illustrated in FIGS. 9 and 10, but may adopt the semicircular shape illustrated in FIG. 11 or the roller system illustrated in FIG. 12.

Fifth Embodiment

Figure 14:
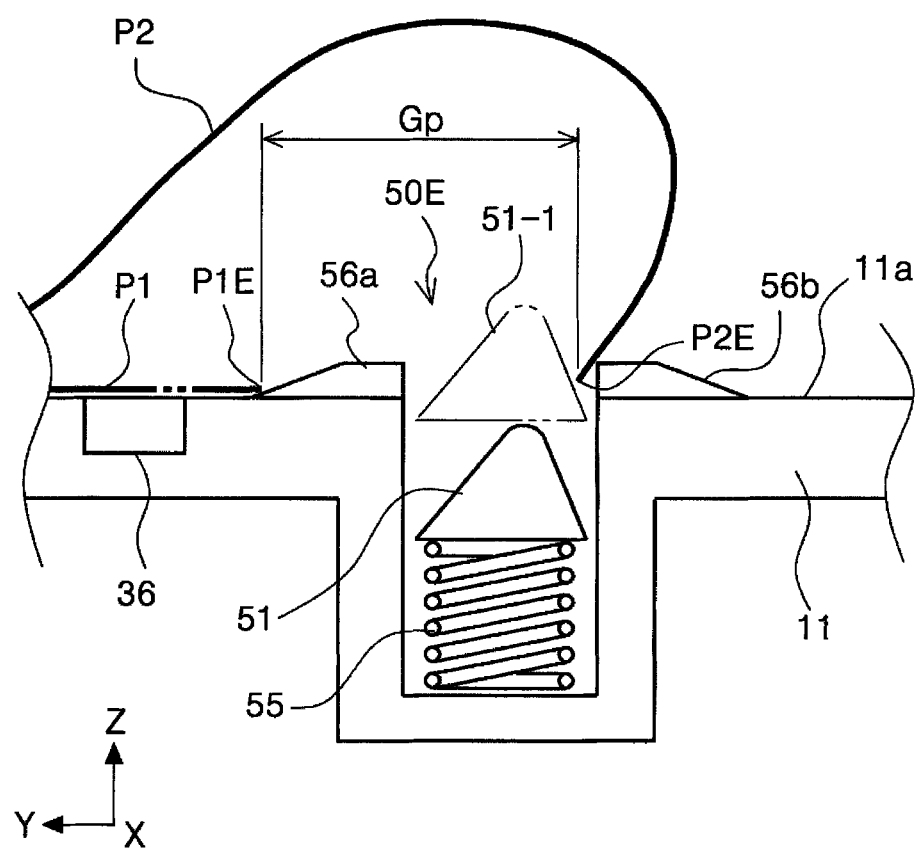
FIG. 14 is a side view of an interval forming unit according to a fifth embodiment.

Further, in the fourth embodiment, step shapes may be formed upstream and downstream of the protrusion 51 to form a fifth embodiment as illustrated in FIG. 14. FIG. 14 illustrates an interval forming unit 50E according to the fifth embodiment.

In FIG. 14, reference numeral 56a denotes a projected portion provided downstream of the protrusion 51, and reference numeral 56b denotes a projected portion provided upstream of the protrusion 51. With such a configuration, the second document P2 is easily bent in the feeding direction, and the upward bulge of the second document P2 described with reference to FIG. 6 is easily formed.

Sixth Embodiment

Figure 15:
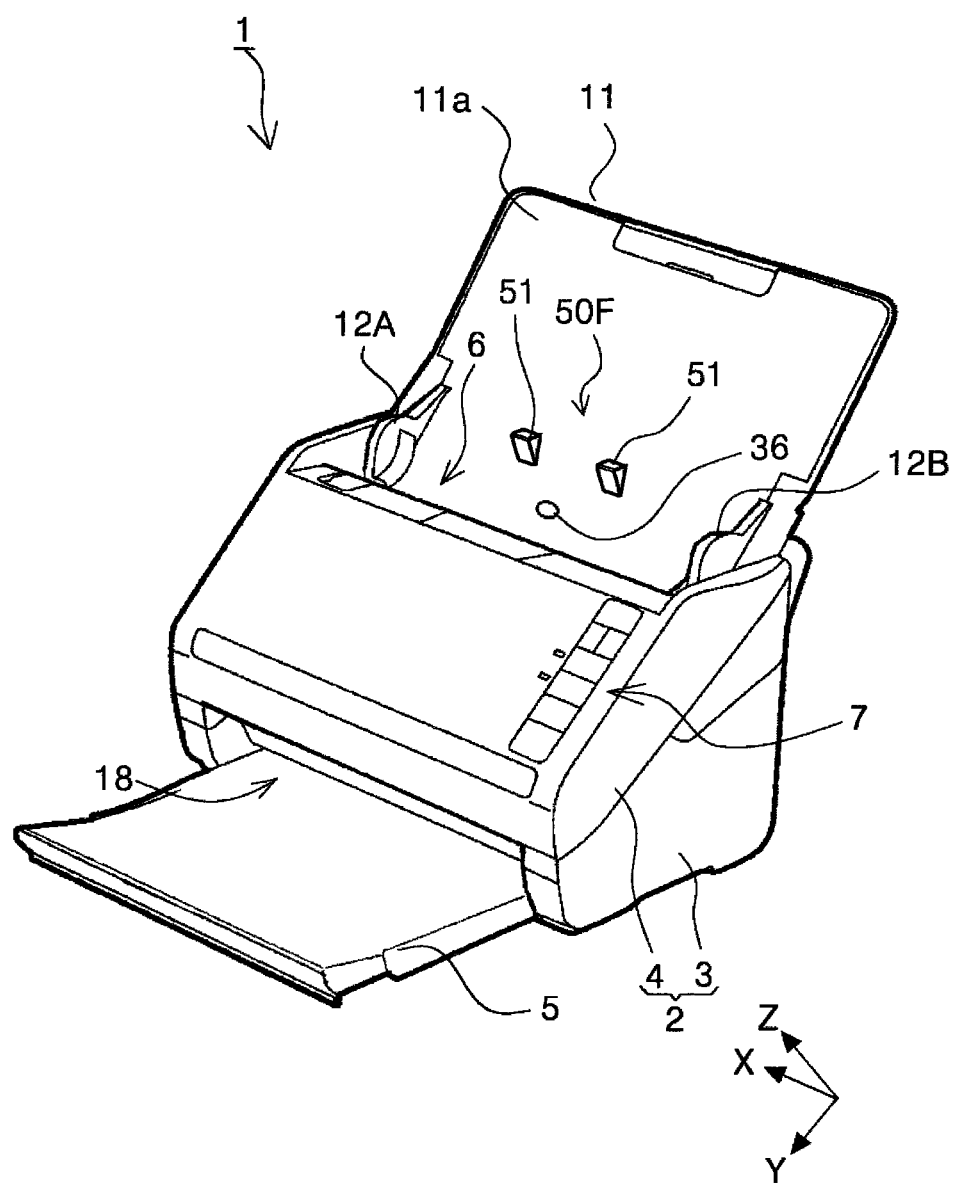
FIG. 15 is a perspective view of an interval forming unit according to a sixth embodiment.

In the above-described first to fourth embodiments, a plurality of protrusions constituting each interval forming unit may be provided in the X-axis direction. FIG. 15 illustrates, as an example, an interval forming unit 50F in which a plurality of the protrusions 51 described with reference to FIGS. 9 and 10 are provided at intervals in the X-axis direction.

As described above, by providing the plurality of the protrusions at intervals in the X-axis direction, the interval Gp can be formed more reliably.

In the example of FIG. 15, two protrusions 51 are disposed symmetrically with respect to the position of the two-dimensional sensor 36 in the X-axis direction.

However, the number of protrusions is not limited to the embodiment, and three or more protrusions may be disposed.

Seventh Embodiment

Figure 16:
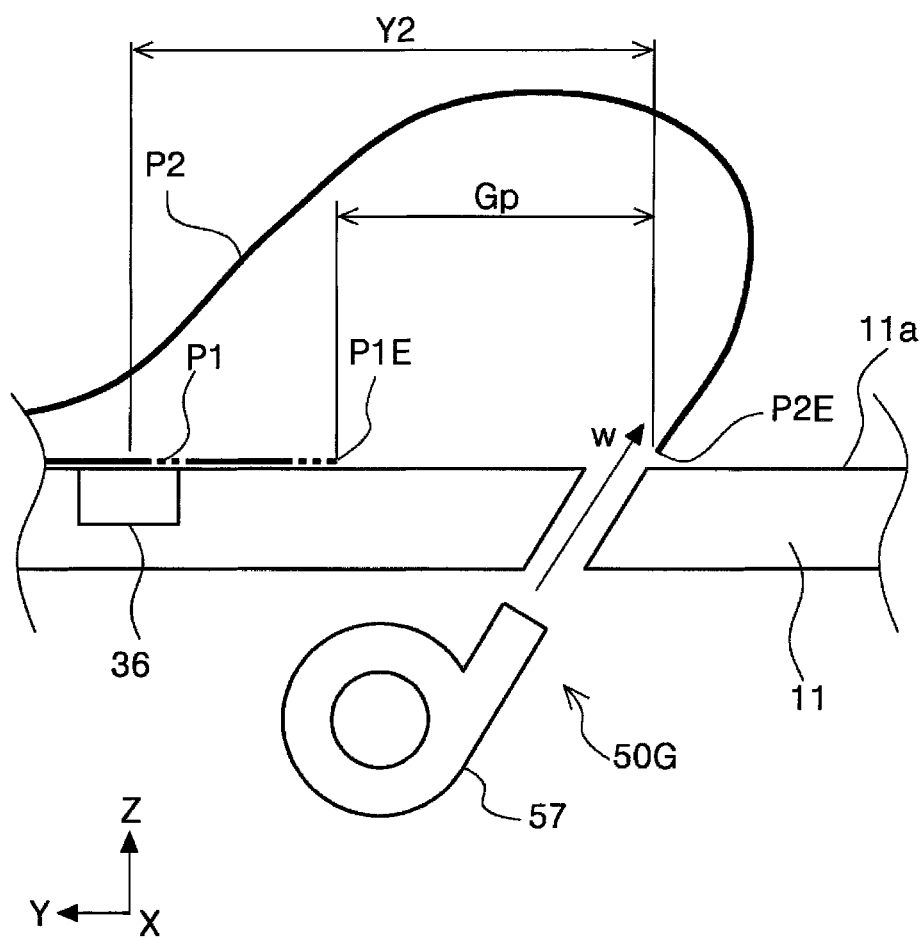
FIG. 16 is a side view of an interval forming unit according to a seventh embodiment.

Hereinafter, an interval forming unit 50G according to a seventh embodiment will be described with reference to FIG. 16. The interval forming unit 50G is configured to include a blower 57 that is an example of a blowing unit that blows air upward from below the mounting surface 11a.

The blower 57 is a blower that blows air in a direction indicated by a reference numeral w. In the present embodiment, the blowing direction w is not a direction orthogonal to the mounting surface 11a but includes a component in an upstream direction, that is, a component in the −Y direction. With such a blower 57, the trailing end P2E of the second document P2 can be separated from the trailing end P1E of the first document P1, and the interval Gp can be appropriately formed.

A position of the blower 57 in the X-axis direction is preferably the position of the two-dimensional sensor 36, but may be slightly shifted from the position of the two-dimensional sensor 36.

Eighth Embodiment

Figure 17:
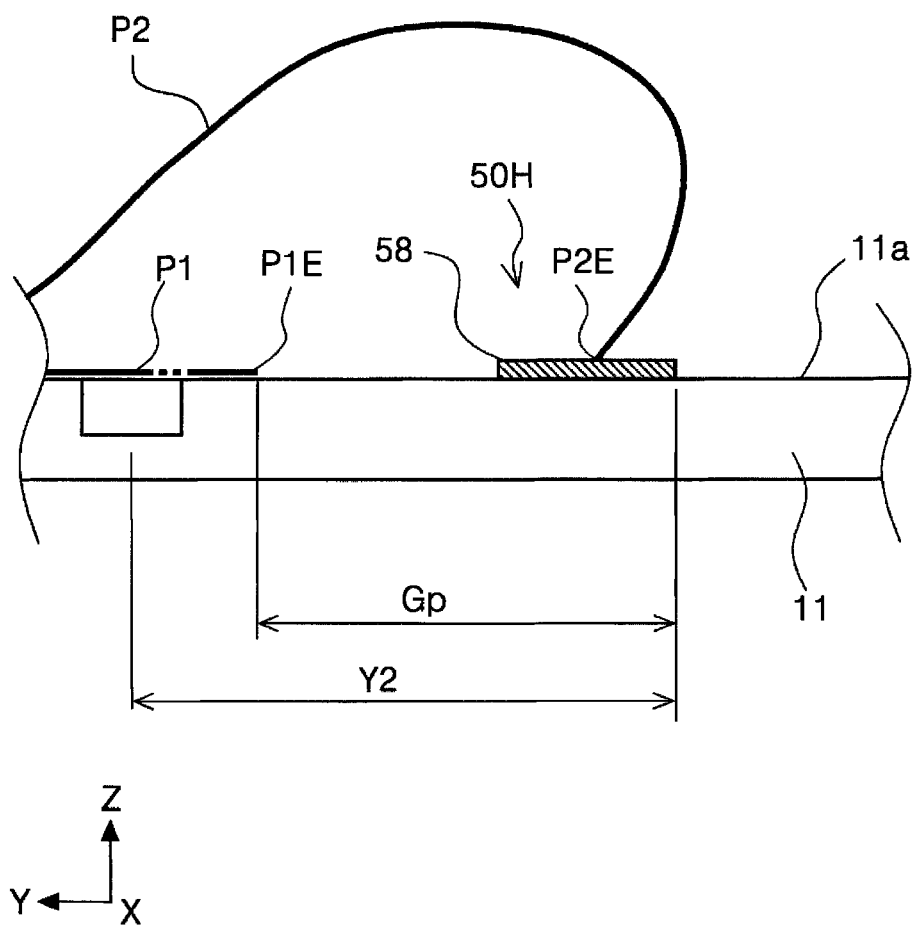
FIG. 17 is a side view of an interval forming unit according to an eighth embodiment.

Hereinafter, an interval forming unit 50H according to an eighth embodiment will be described with reference to FIG. 17. The interval forming unit 50H is configured to include a friction member 58 provided on the mounting surface 11a.

The friction member 58 has a certain thickness, an upper surface projects from the mounting surface 11a, and the upper surface is formed as a friction surface. As the friction member 58, for example, an elastic material such as cork, rubber, sponge, or felt can be used. Alternatively, the friction surface can be formed by forming a large number of irregularities on an upper surface of a hard material such as plastic.

By providing such a friction member 58, the trailing end P2E of the second document P2 is caught by the friction member 58, and the interval Gp can be formed.

Ninth Embodiment

Hereinafter, an interval forming unit 50J according to a ninth embodiment will be described with reference to FIGS. 18 and 19.

The interval forming unit 50J is configured to include an eaves portion 60 that is disposed to face the mounting surface 11a and abuts against the bulge portion of the second document P2 bulging upward. Therefore, the upward bulge formed on the second document P2 is pressed by the eaves portion 60, so that the trailing end P2E of the second document P2 is easily separated from the trailing end P1E of the first document P1, and an appropriate interval Gp can be formed.

Figure 8:
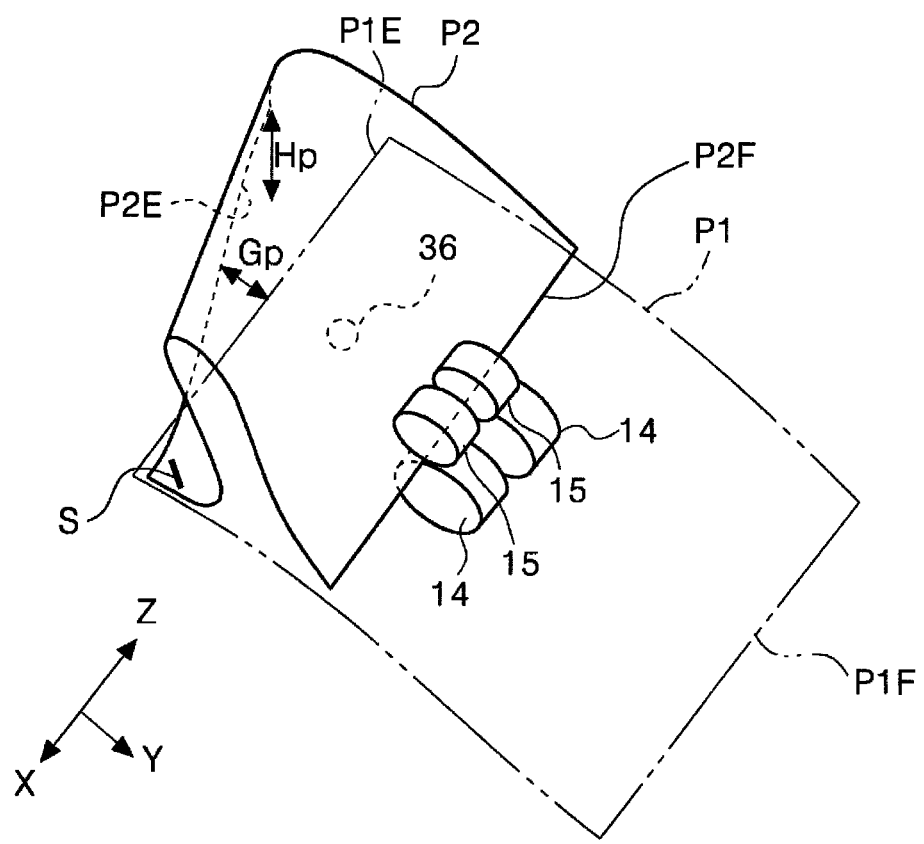
FIG. 8 is a schematic view illustrating a phenomenon that occurs when a stapled document is fed.

In addition, as illustrated in FIG. 8, the trailing end P2E of the second document P2 may rise from the mounting surface 11a, and an interval Hp in the Z-axis direction may be formed between the trailing end P2E of the second document P2 and the mounting surface 11a. If the interval Hp is large, the trailing end P2E of the second document P2 may not be detected by the two-dimensional sensor 36.

However, as described above, the upward bulge formed in the second document P2 is pressed by the eaves portion 60, so that rising of the trailing end P2E of the second document P2 from the mounting surface 11a can be suppressed.

Figure 18:
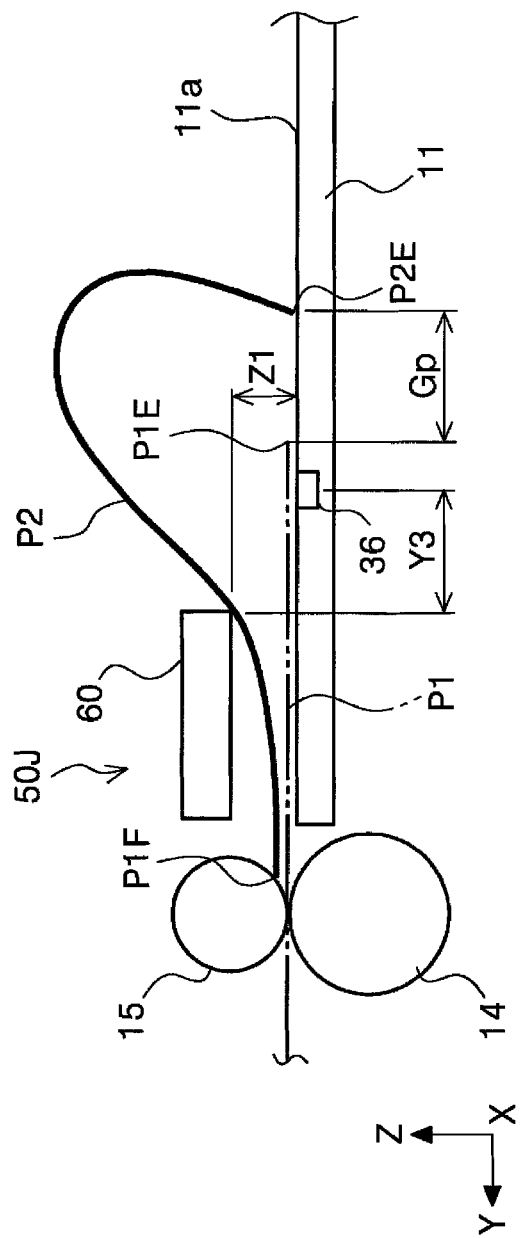
FIG. 18 is a side view of an interval forming unit according to a ninth embodiment.

In FIG. 18, it is preferable that a distance Y3 in the Y-axis direction from an upstream end of the eaves portion 60 to the two-dimensional sensor 36 be set to, for example, 20 mm to 30 mm or more.

Further, it is preferable that an interval Z1 between the mounting surface 11a and a lower surface of the eaves portion 60 be, for example, a value obtained by adding a certain margin to a maximum stacking height of the documents on the mounting surface 11a.

Tenth Embodiment

Hereinafter, an interval forming unit 50K according to a tenth embodiment will be described with reference to FIG. 20.

Figure 19:
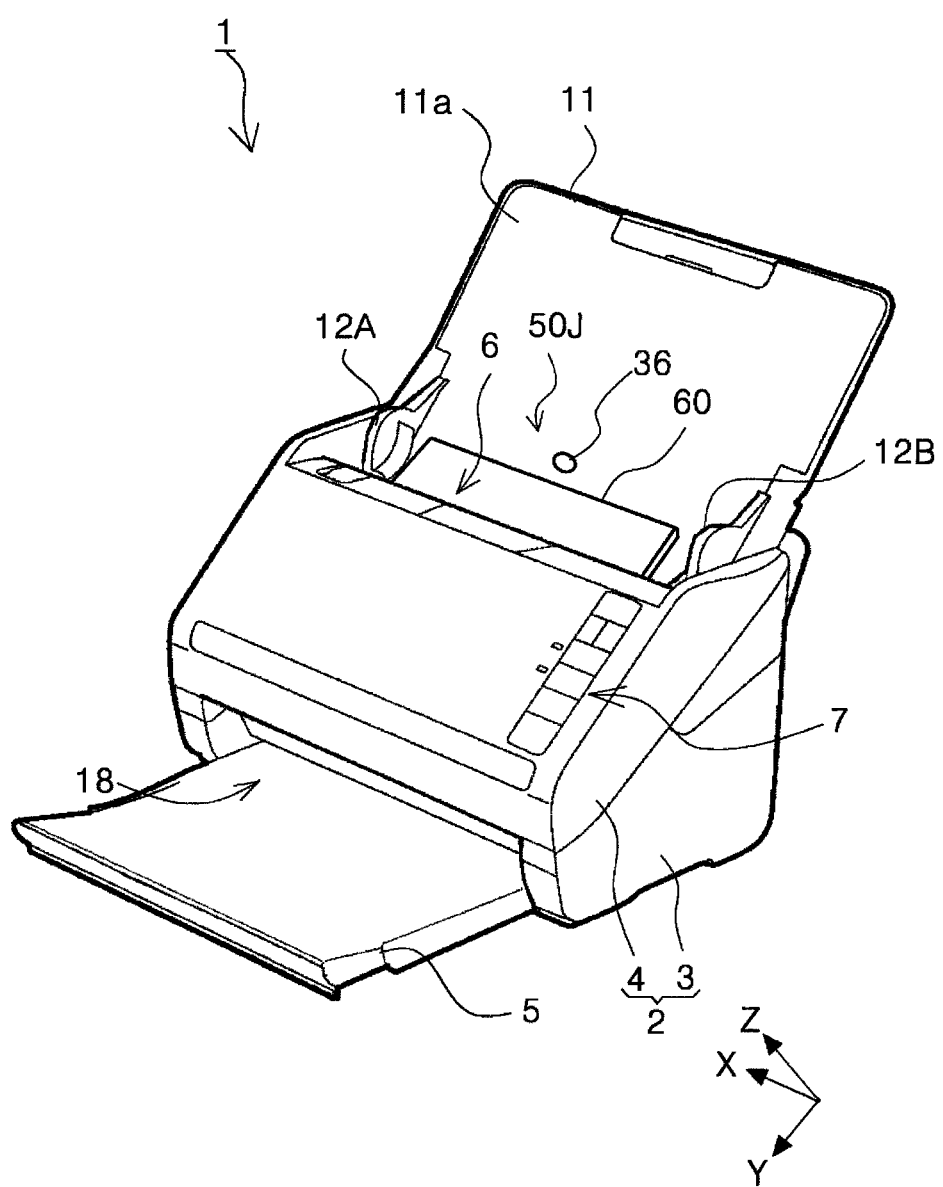
FIG. 19 is a perspective view of an interval forming unit according to a ninth embodiment.
Figure 20:
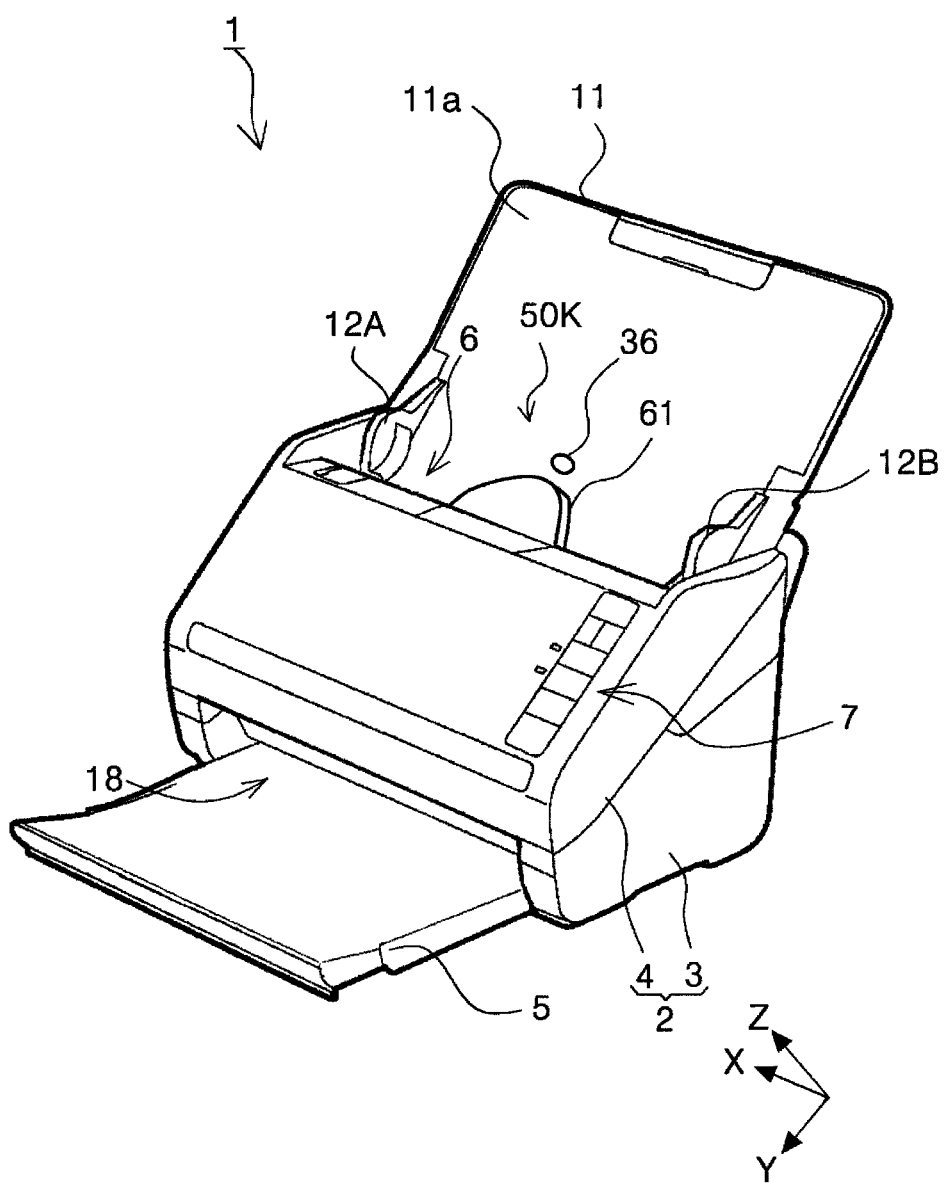
FIG. 20 is a perspective view of an interval forming unit according to a tenth embodiment.

Although the above-described interval forming unit 50J is formed in a rectangular shape when the mounting surface 11a is viewed in a plan view as illustrated in FIG. 19, an eaves portion 61 configuring the interval forming unit 50K according to the present embodiment as illustrated in FIG. 20 has a shape that tapers upstream in the feeding direction when the mounting surface 11a is viewed in a plan view. By forming the eaves portion 61 in such a shape, when the bulge formed in the second document P2 abuts against the eaves portion 61, the degree of freedom of the posture change in the bulge is improved, and the interval Gp is easily formed.

Eleventh Embodiment

Hereinafter, an interval forming unit 50M according to an eleventh embodiment will be described with reference to FIG. 21.

Figure 21:
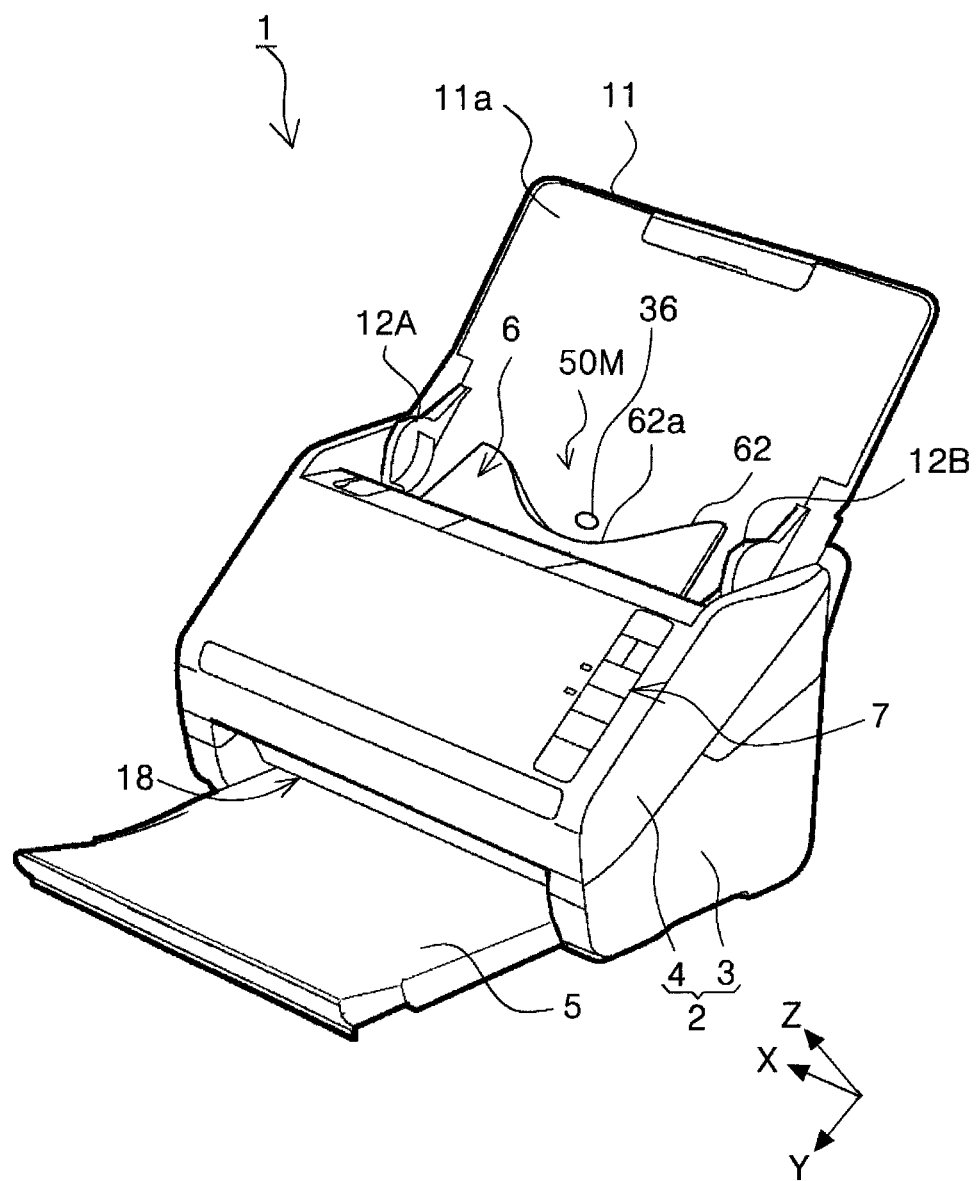
FIG. 21 is a perspective view of an interval forming unit according to an eleventh embodiment.

As illustrated in FIG. 21, in the interval forming unit 50M according to the present embodiment, an eaves portion 62 has a recess portion 62a that is recessed toward a downstream region in the feeding direction when the mounting surface 11a is viewed in a plan view. The eaves portion 62 is formed in such a shape, so that when the document is added to the document mounting section 11 or the like, the finger can enter the recess portion 62a and when the document is added to the document mounting section 11 or the like, it is possible to suppress that the eaves portion 62 is obstructed.

Twelfth Embodiment

Hereinafter, an interval forming unit 50N according to a twelfth embodiment will be described with reference to FIG. 22.

Figure 22:
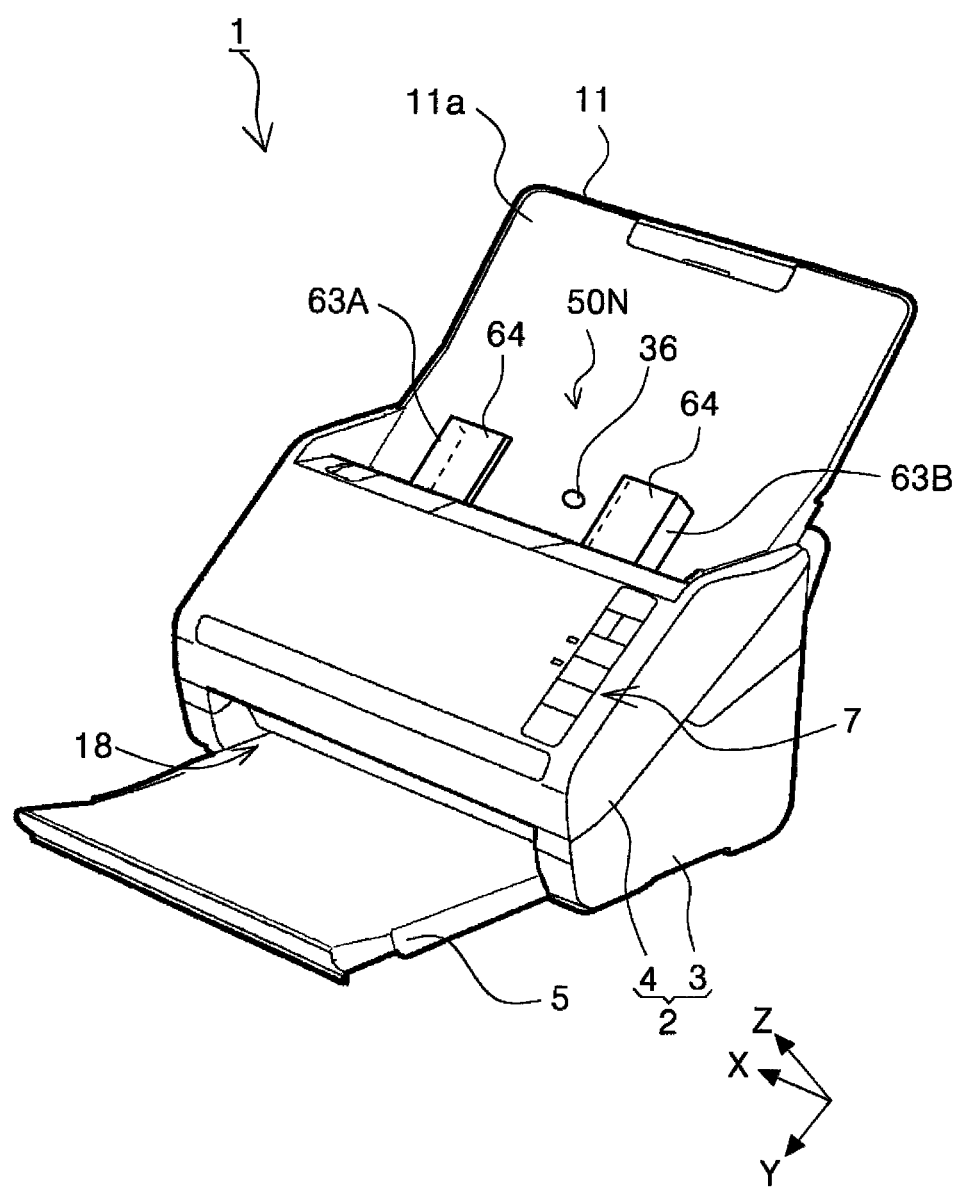
FIG. 22 is a perspective view of an interval forming unit according to a twelfth embodiment.

As illustrated in FIG. 22, in the interval forming unit 50N according to the present embodiment, eaves portions 64 are provided on edge guides 63A and 63B, respectively. As described above, the eaves portions 64 are provided on the edge guides 63A and 63B, when the document is added to the document mounting section 11 or the like, it is possible to suppress that the eaves portions 64 are obstructed.

Thirteenth Embodiment

Hereinafter, an interval forming unit 50P according to a thirteenth embodiment will be described with reference to FIG. 23.

Figure 23:
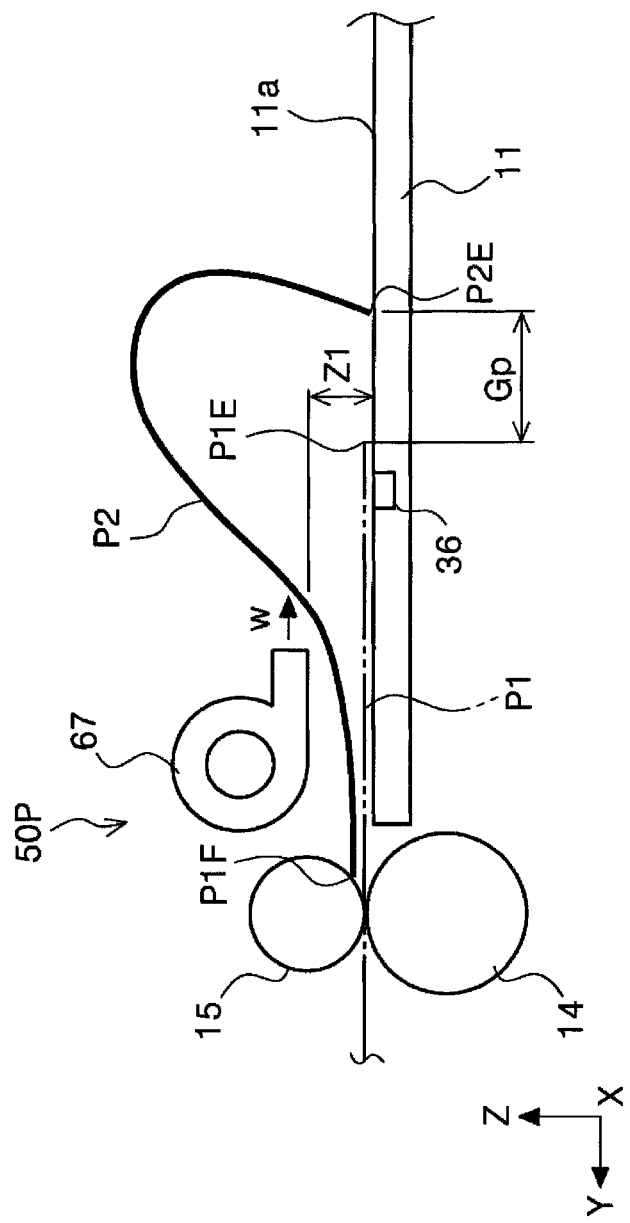
FIG. 23 is a perspective view of an interval forming unit according to a thirteenth embodiment.

As illustrated in FIG. 23, the interval forming unit 50P according to the present embodiment is configured to include a blower 67 as a blowing unit that blows air upstream from a downstream region in the feeding direction with respect to the bulge portion of the second document P2 which is bulged upward. In the present embodiment, the blowing direction w is set in a direction parallel to the mounting surface 11a, but is not limited to the embodiment, and may include a component in a direction intersecting with the mounting surface 11a. With such a blowing unit, the upward bulge formed in the second document P2 can be pressed, the trailing end P2E of the second document P2 is easily separated from the trailing end P1E of the first document P1, and the interval Gp can be formed appropriately.

At the same time, it is possible to suppress that the trailing end P2E of the second document P2 rises from the mounting surface 11a.

Fourteenth Embodiment

Figure 24:
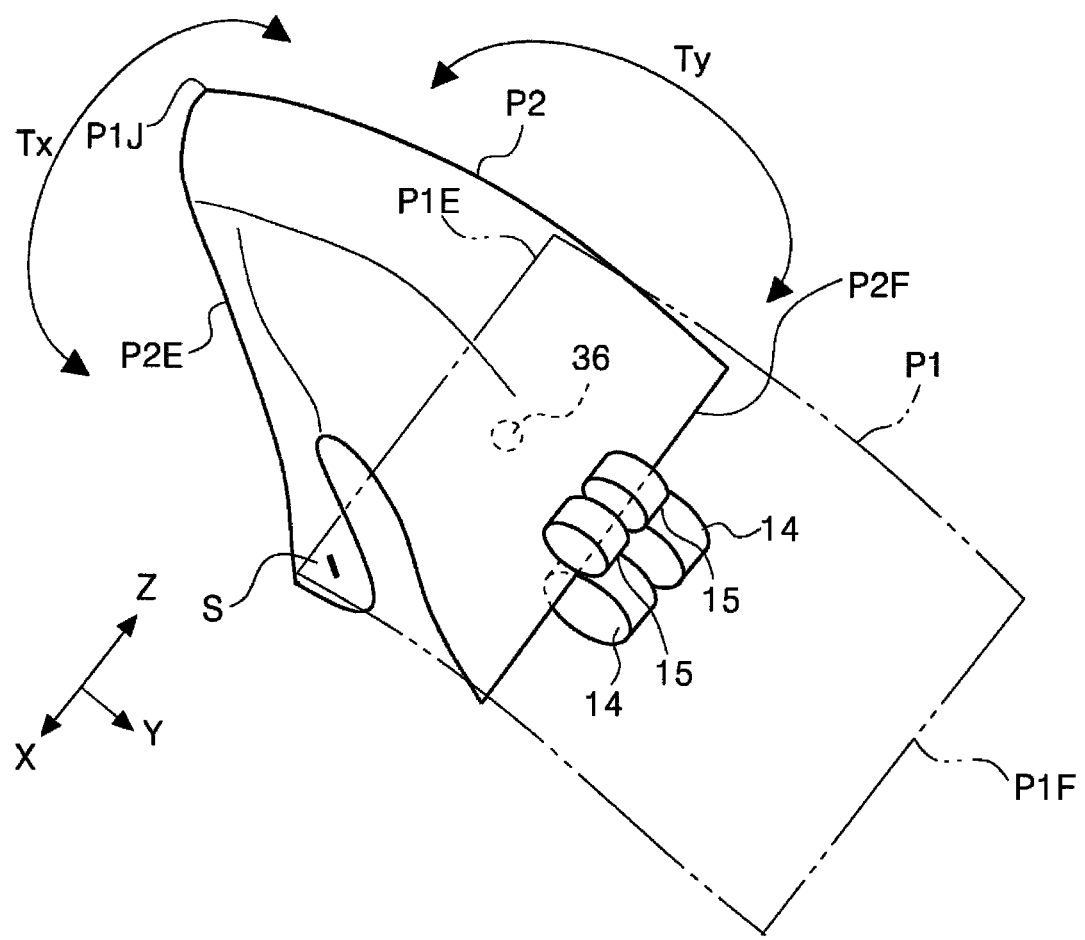
FIG. 24 is a schematic view illustrating a phenomenon that occurs when a document bound by a binding needle is fed.

Hereinafter, a fourteenth embodiment will be described with reference to FIGS. 24 and 25.

As described with reference to FIG. 6, in order to form the interval Gp between the trailing end P1E of the first document P1 and the trailing end P2E of the second document P2, the second document P2 is curved in the feeding direction and has to bulge appropriately upward. However, when the document mounted on the mounting surface 11a is in a state of being difficult to curve in the feeding direction, specifically, when the document curves in the width direction which is a direction intersecting with the feeding direction and the rigidity thereof in the feeding direction is increased, as illustrated in FIG. 24, the second document P2 cannot appropriately curve in the feeding direction, and a corner P1J on a side opposite to the binding needle S in the X-axis direction may remain at an initial position. Therefore, the trailing end P2E of the second document P2 may not be able to advance downstream. In FIG. 24, an arrow Ty indicates a direction of the curvature in the feeding direction, and an arrow Tx indicates a direction of the curvature in the width direction.

If the trailing end P2E of the second document P2 cannot advance downstream by curving the second document P2 in the curving direction Tx, the interval Gp is too large, and the determination of the feeding abnormality is delayed, or the feeding abnormality cannot be determined, and the document may be damaged.

Accordingly, in the present embodiment, as illustrated in FIG. 25, a curve forming portion 69 is provided to form a curve in the feeding direction on the document mounted on a mounting surface 68a upstream of the two-dimensional sensor 36 in a document mounting section 68. In the present embodiment, the curve forming portion 69 is formed as a step shape having a step Z2. With such a curve forming portion 69, the curve in the feeding direction can be appropriately formed with respect to the document mounted on the mounting surface 68a, and the trailing end P2E of the second document P2 can advance downstream.

In FIG. 25, a distance Y4 is a distance in the Y-axis direction between the document nip position S1 by the feeding roller 14 and the separation roller 15, and the curve forming portion 69, and can be set to, for example, 70 mm to 90 mm. It is preferable that a length of the curve forming portion 69 in the X-axis direction be set to equal to or greater than a maximum document width, but the length thereof may be a length that allows the document to curve in the feeding direction.

Further, the present disclosure is not limited to the embodiments described above, and various modifications are possible within the scope of the disclosure described in the claims, and it is needless to say that they are also included in the scope of the present disclosure.

What is claimed is:

1. A medium feeding device comprising:
   a medium mounting section that forms a medium mounting surface on which a medium is mounted;
   a feeding unit that feeds a lowest medium among media mounted on the medium mounting section in a feeding direction by coming into contact with the lowest medium;
   a separation unit that separates the medium with the feeding unit;
   an operation detection unit that is disposed at a position facing a surface of the medium in the medium mounting section and detects at least a movement of the medium in the feeding direction;
   a plurality of interval forming units that are provided upstream of the operation detection unit and that are offset with the operation detection unit in a width direction of the medium feeding device, the feeding unit and the separation unit in the feeding direction, the plurality of interval forming units each having a bottom surface that contacts the medium mounting surface and a surface that projects upwardly from the medium mounting surface that is upstream of the feeding unit and the separation unit, and forms an interval in the feeding direction between a trailing end of a first medium which is the lowest medium fed by the feeding unit among media mounted on the medium mounting section and a trailing end of a second medium which is bound with the first medium and stacked on the first medium;
   a pair of edge guides that are separate from the plurality of interval forming units; and
   a control unit that stops feeding of the medium based on a detection interval by a detection value of the operation detection unit.

2. The medium feeding device according to claim 1, wherein the plurality of interval forming units are configured to include a protrusion that projects upward from the medium mounting surface.

3. The medium feeding device according to claim 2, wherein an upper end of the protrusion is formed with an R surface.

4. The medium feeding device according to claim 2, wherein the protrusion is provided to be displaceable in a direction intersecting with the medium mounting surface, and is pressed in a direction of projecting from the medium mounting surface.

5. An image reading apparatus comprising:
   a reading unit that reads a medium; and
   the medium feeding device according to claim 1, which feeds the medium toward the reading unit.

6. The medium feeding device according to claim 1, wherein the plurality of interval forming units project upwardly from the medium mounting surface at an angle between 30° and 90° that is upstream of the feeding unit and the separation unit.

7. The medium feeding device according to claim 1, wherein the plurality of interval forming units form the interval in the feeding direction when the trailing end of the second medium caught by the plurality of interval forming units after the trailing end of the first medium has passed through the operation detection unit.

8. A medium feeding device comprising:
   a medium mounting section that forms a medium mounting surface on which a medium is mounted;
   a feeding unit that feeds a lowest medium among media mounted on the medium mounting section in a feeding direction by coming into contact with the lowest medium;
   a separation unit that separates the medium with the feeding unit;
   an operation detection unit that is disposed at a position facing a surface of the medium in the medium mounting section and detects at least a movement of the medium in the feeding direction;
   a control unit that stops feeding of the medium based on a detection value of the operation detection unit;
   a plurality of curve forming portions that are provided upstream of the operation detection unit, the feeding unit and the separation unit in the feeding direction and that are offset with the operation detection unit in a width direction of the medium feeding device, the plurality of curve forming portions each having a bottom surface that contacts the medium mounting surface and a surface that projects upwardly from the medium mounting surface that is upstream of the feeding unit and the separation unit, and forms a curve in the feeding direction on the medium mounted on the medium mounting section; and
   a pair of edge guides that are separate from the plurality of curve forming portions.

* * * * *